M. F. HILL.
SHIP.
APPLICATION FILED DEC. 19, 1918.

1,376,878.

Patented May 3, 1921.
19 SHEETS—SHEET 1.

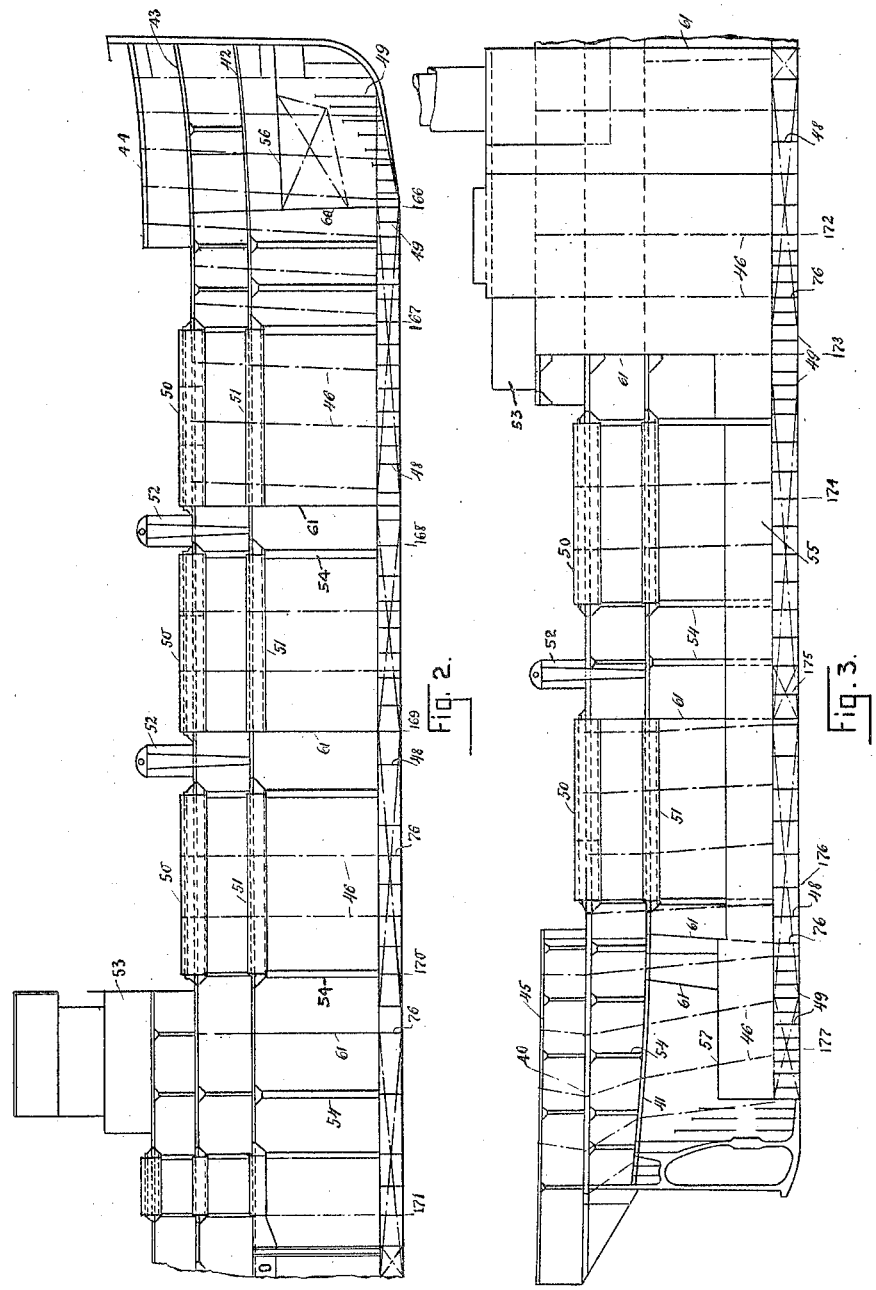

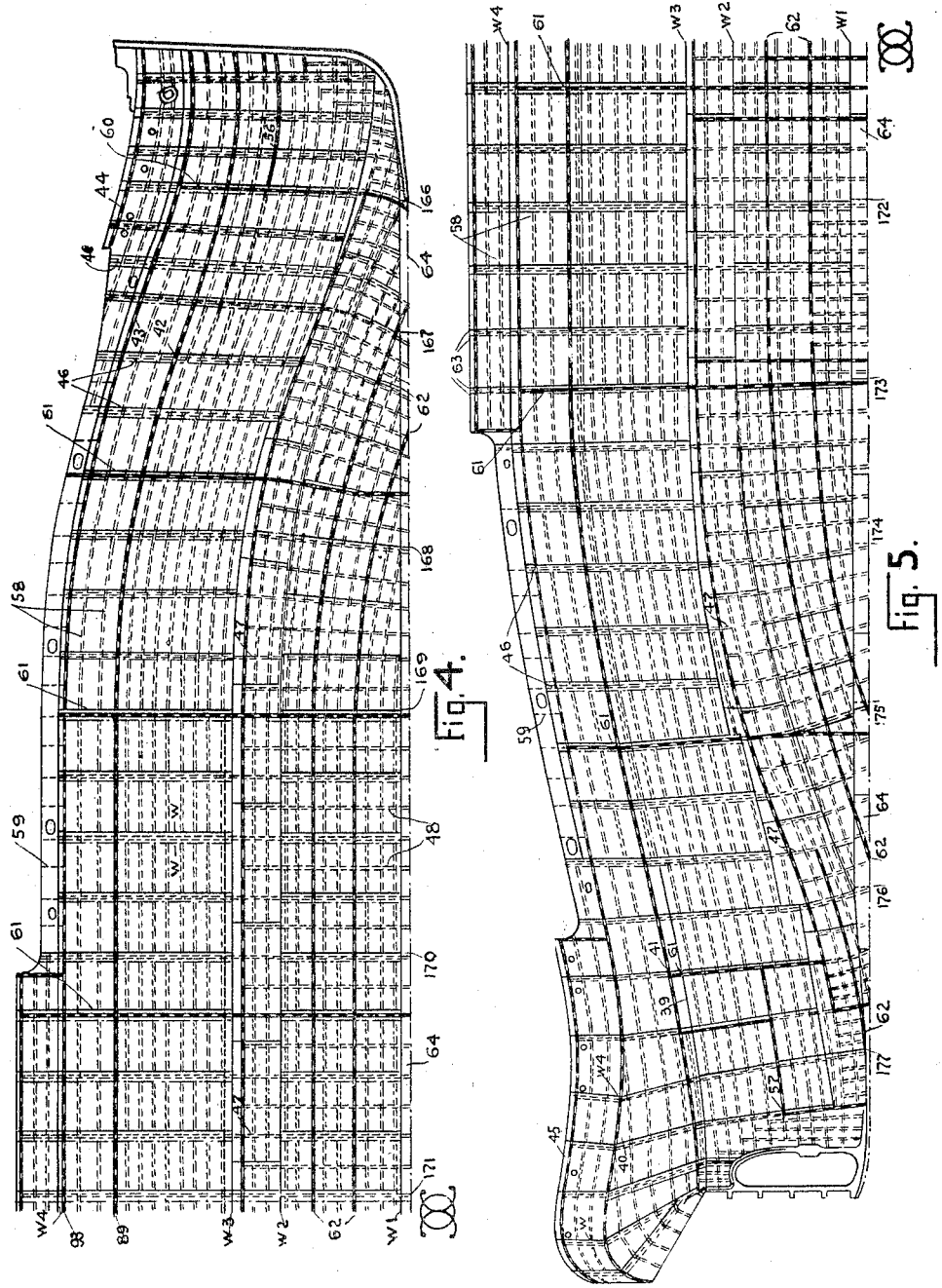

M. F. HILL.
SHIP.
APPLICATION FILED DEC. 19, 1918.
1,376,878.
Patented May 3, 1921.
19 SHEETS—SHEET 4.
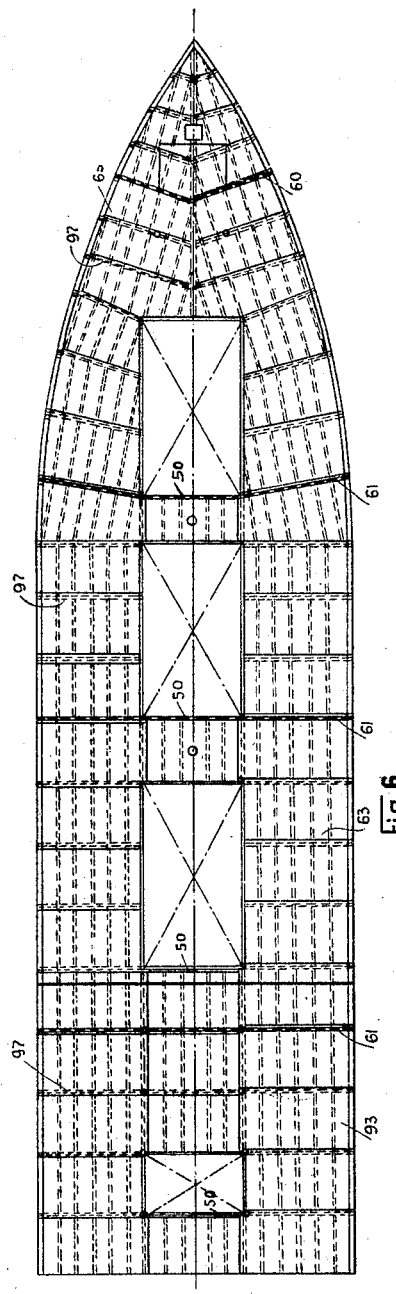
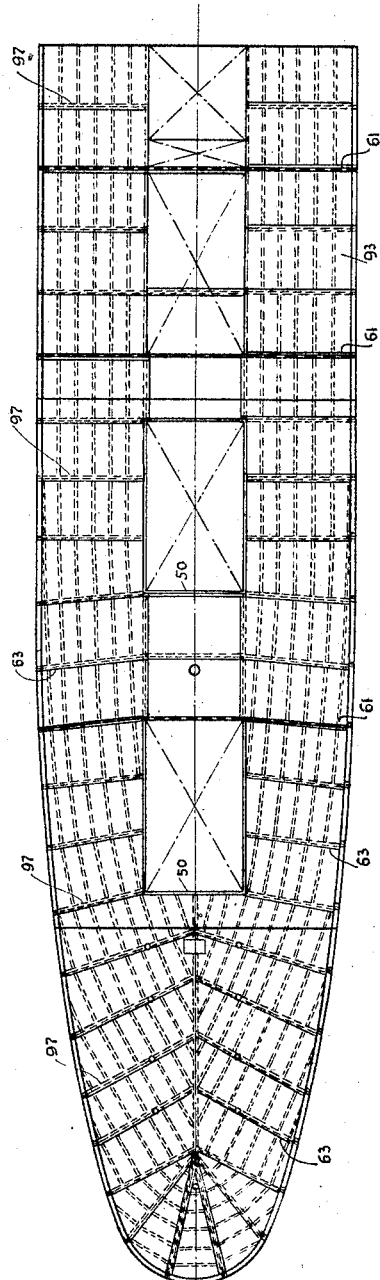

M. F. HILL.
SHIP.
APPLICATION FILED DEC. 19, 1918.
1,376,878. Patented May 3, 1921.
19 SHEETS—SHEET 5.
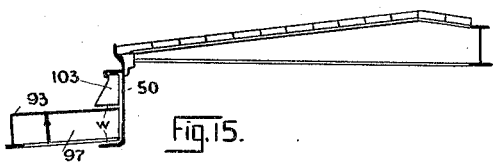
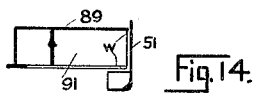
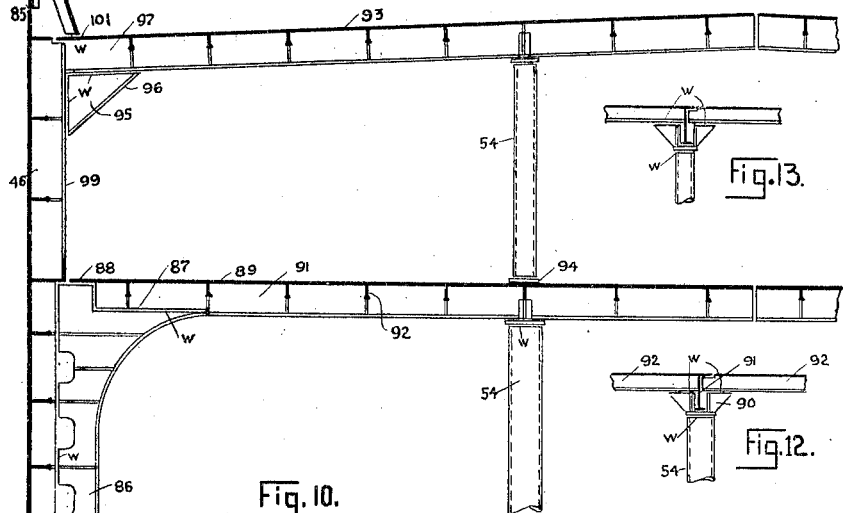
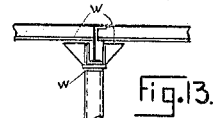
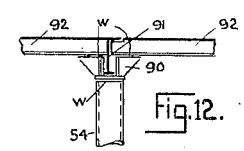
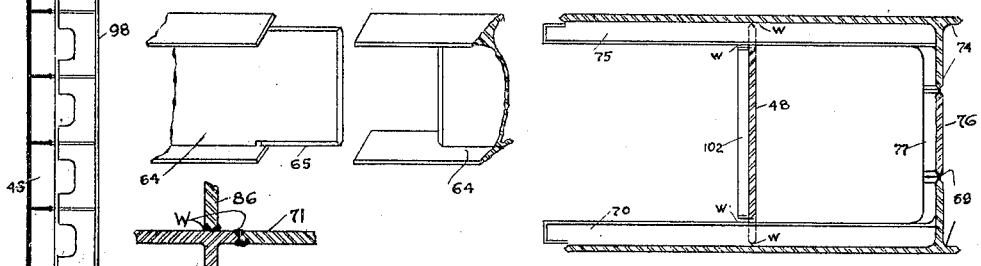
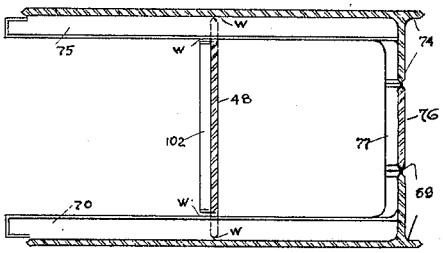
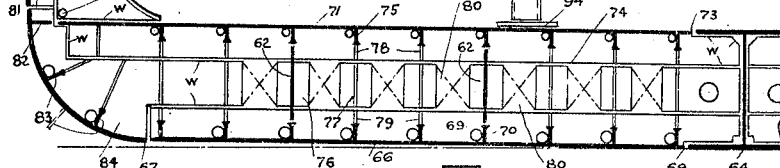
INVENTOR
Myron F Hill
BY Williams & Pritchard
ATTORNEYS

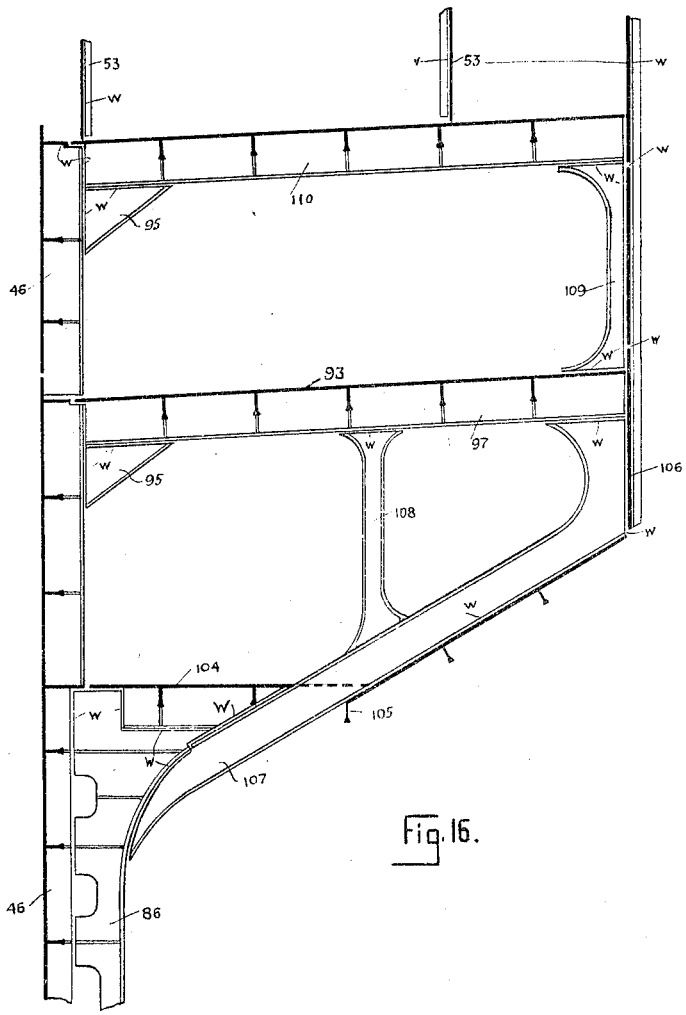

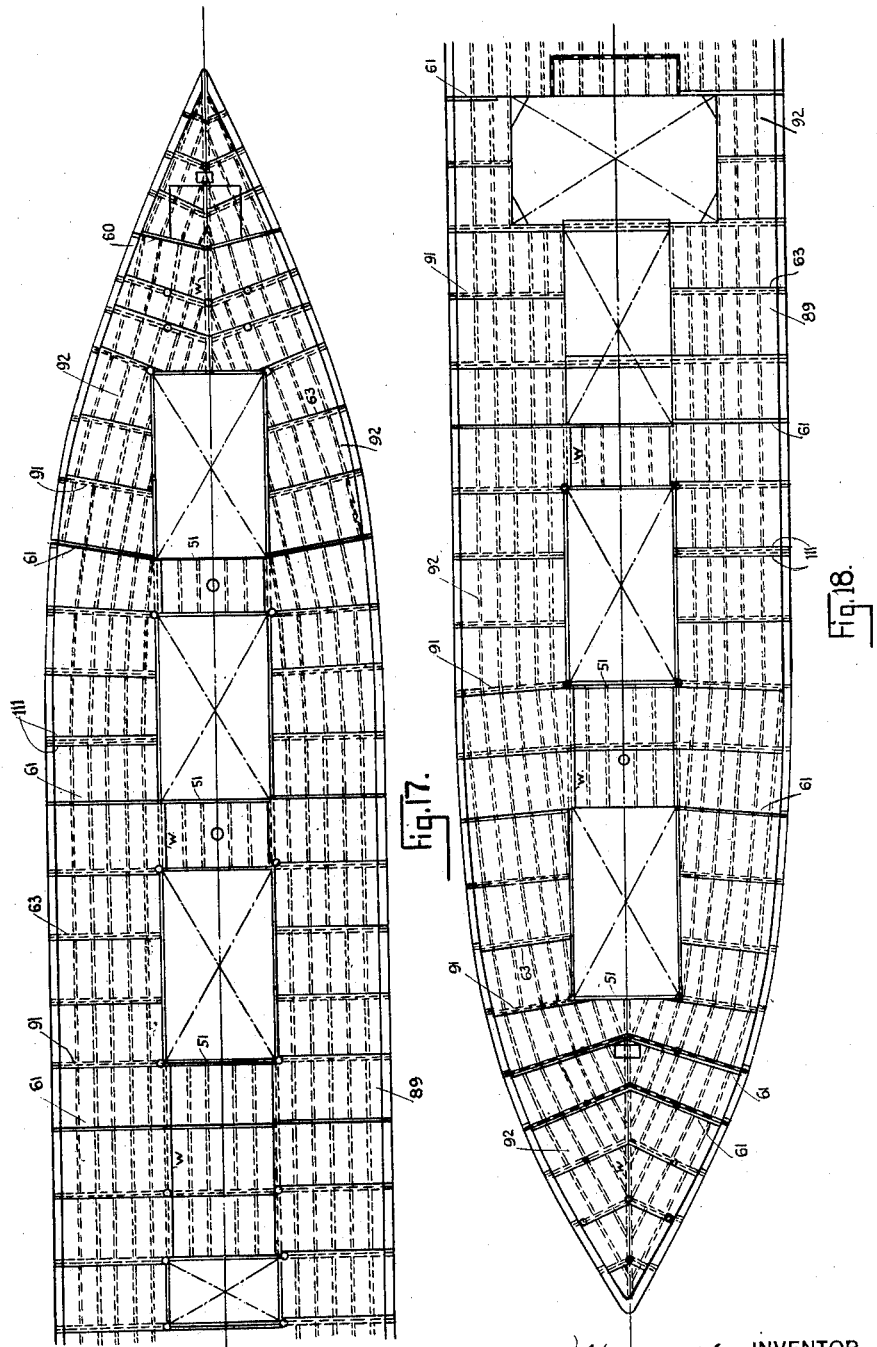

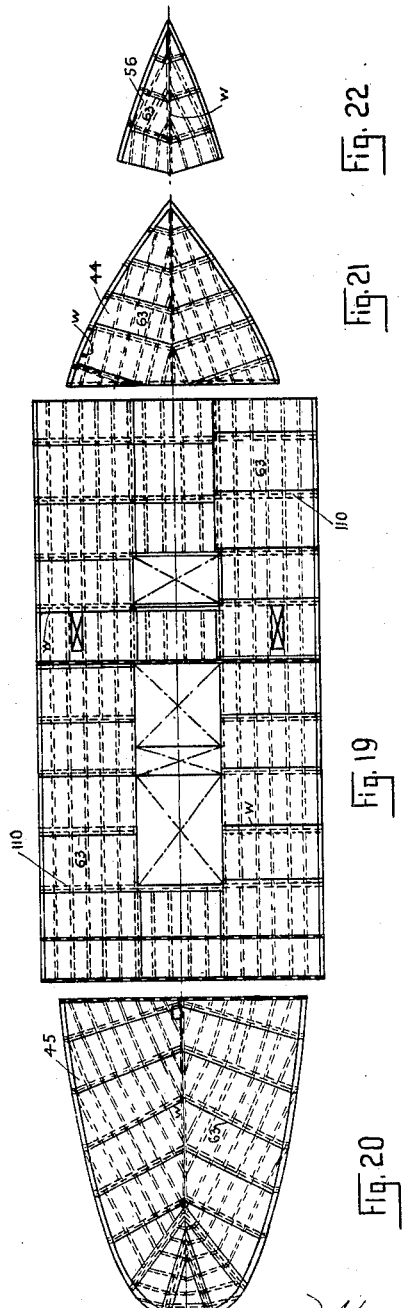

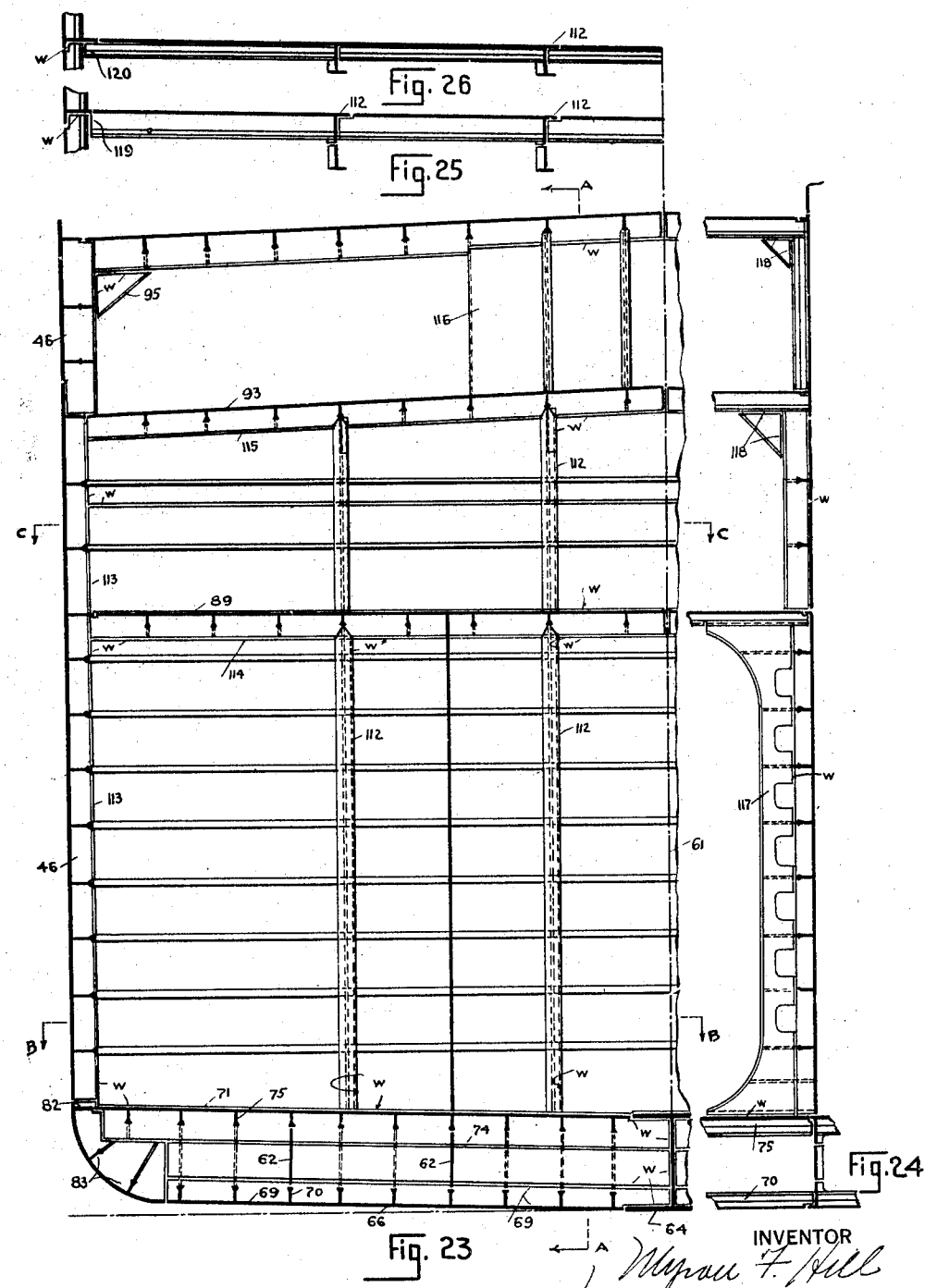

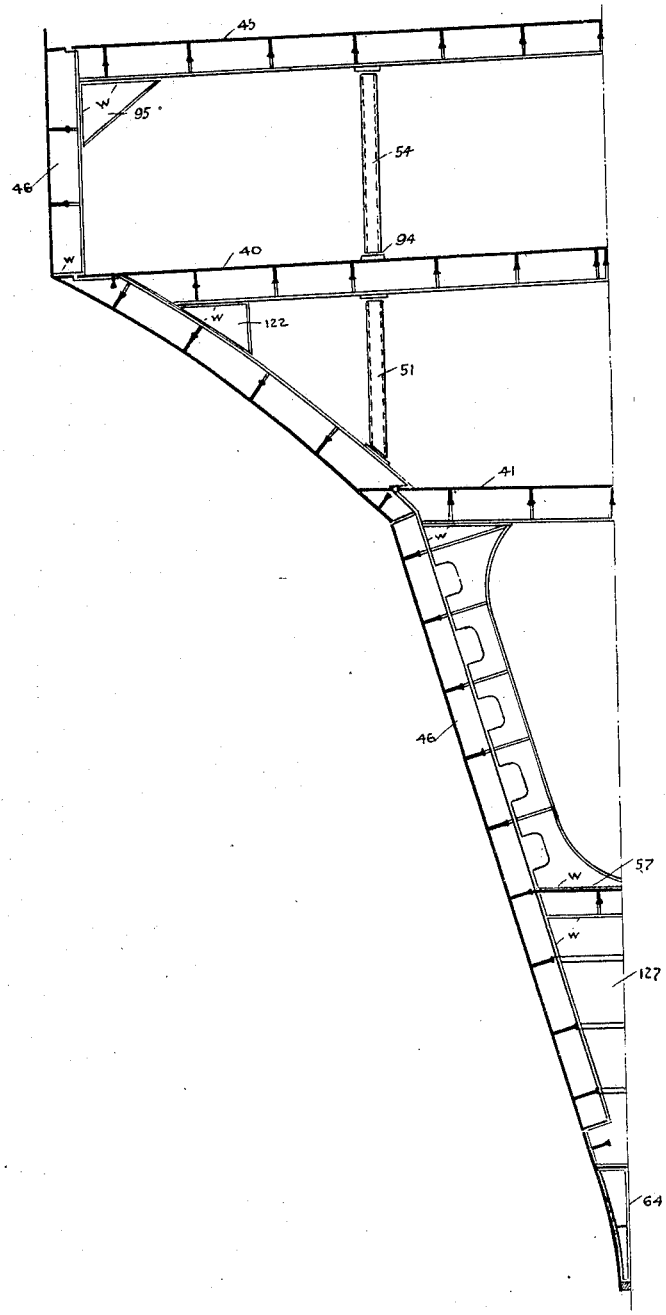

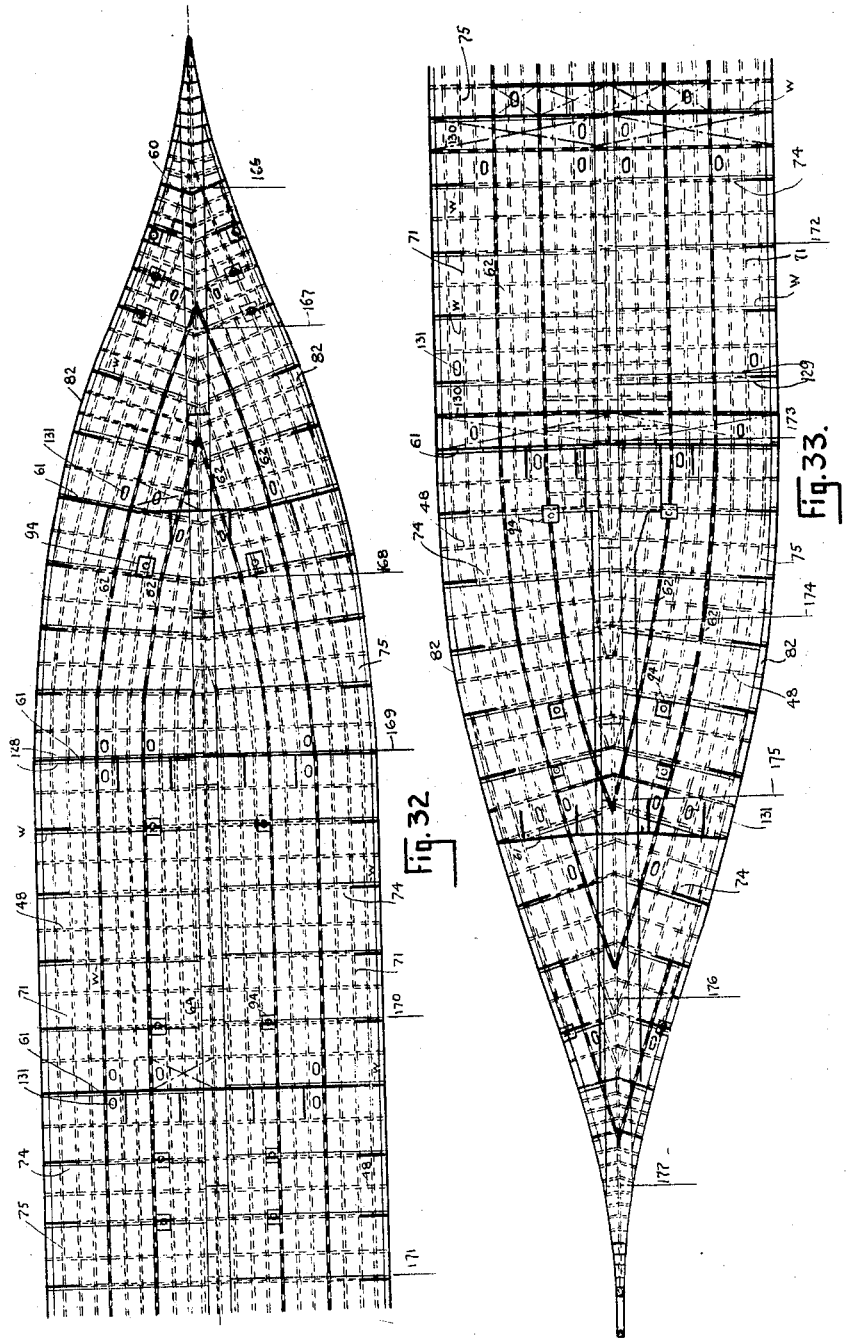

M. F. HILL.
SHIP.
APPLICATION FILED DEC. 19, 1918.
1,376,878.
Patented May 3, 1921.
19 SHEETS—SHEET 15.
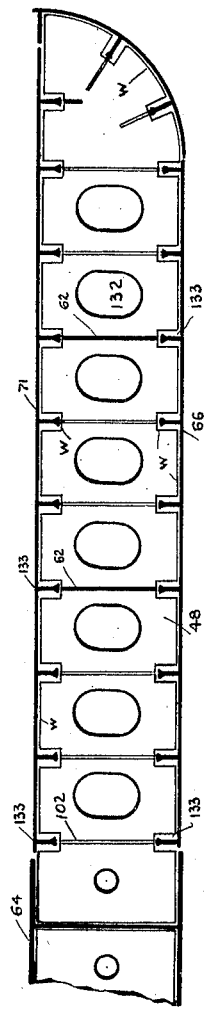
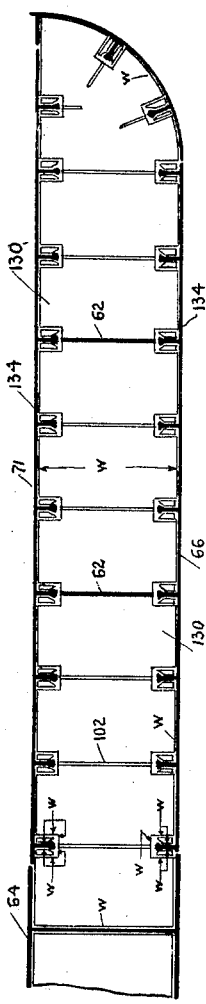
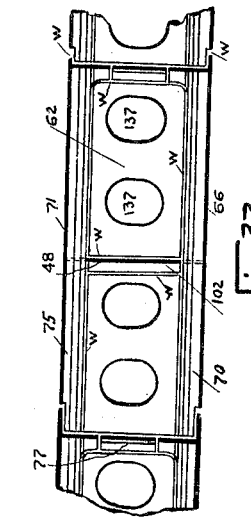
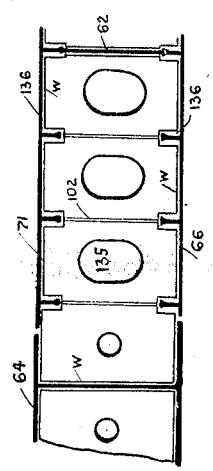
INVENTOR
Myron F. Hill
BY
Williams & Pritchard
ATTORNEY

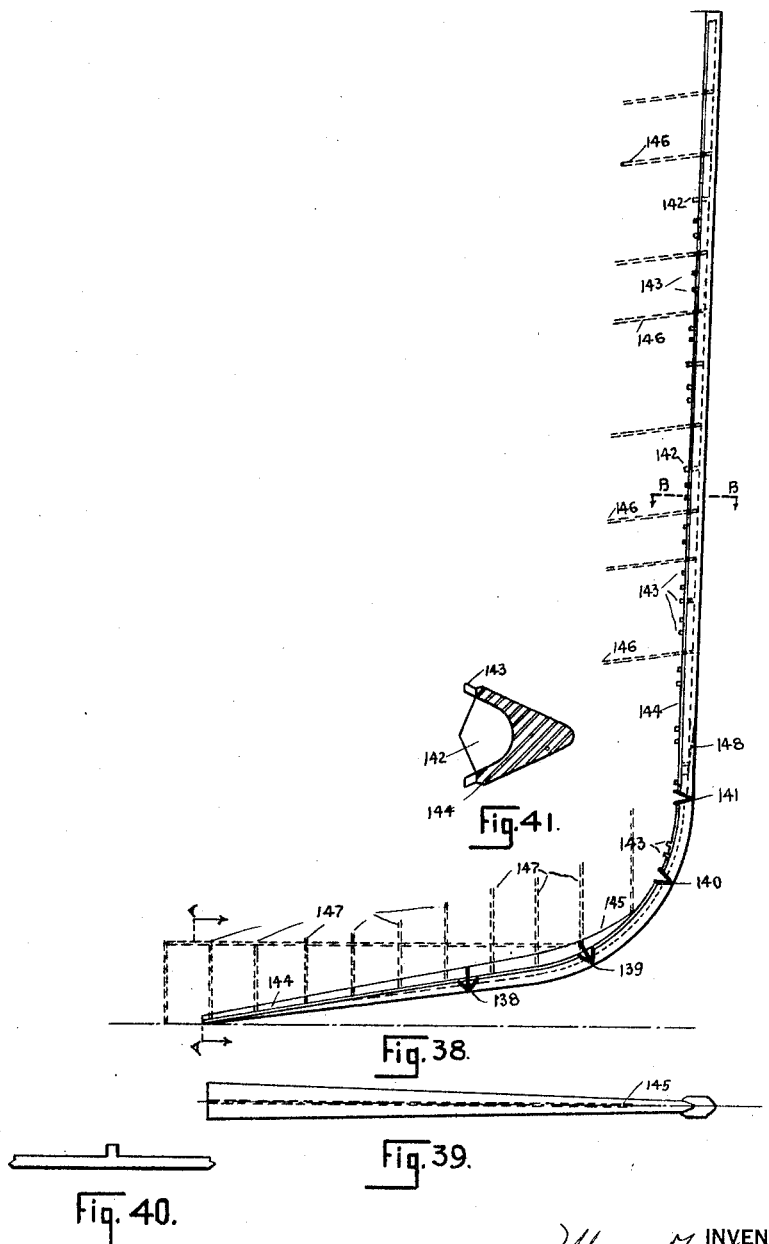

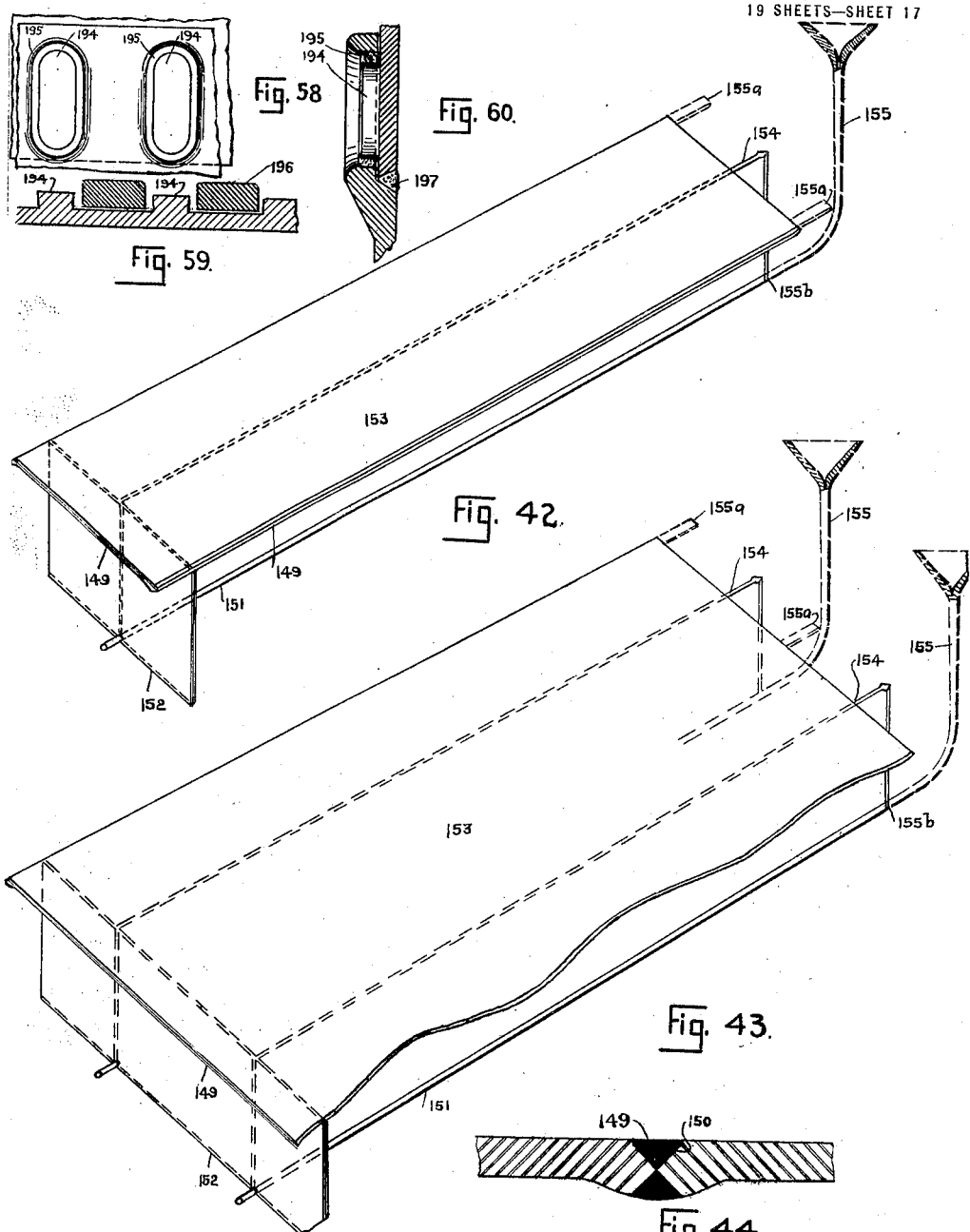

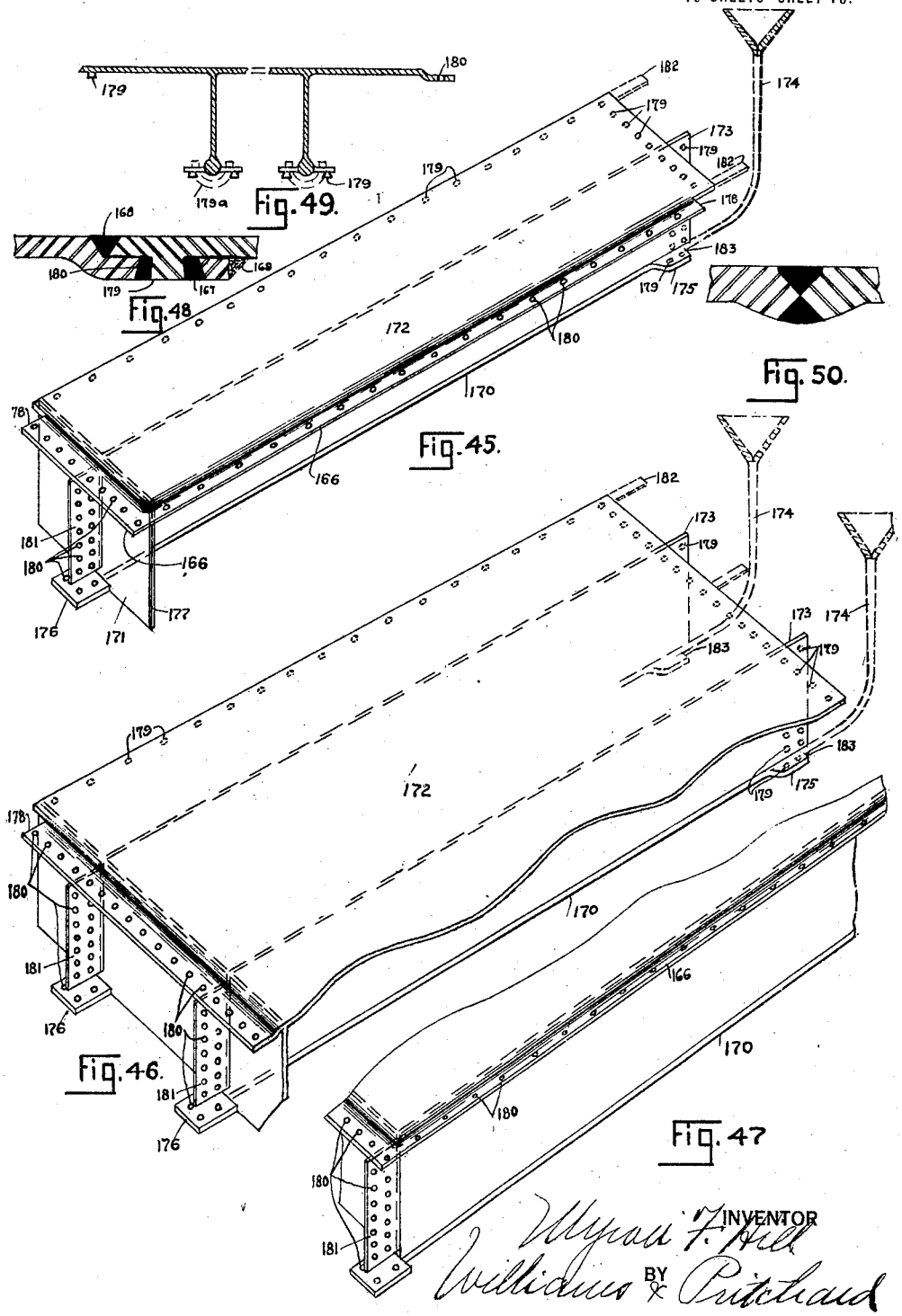

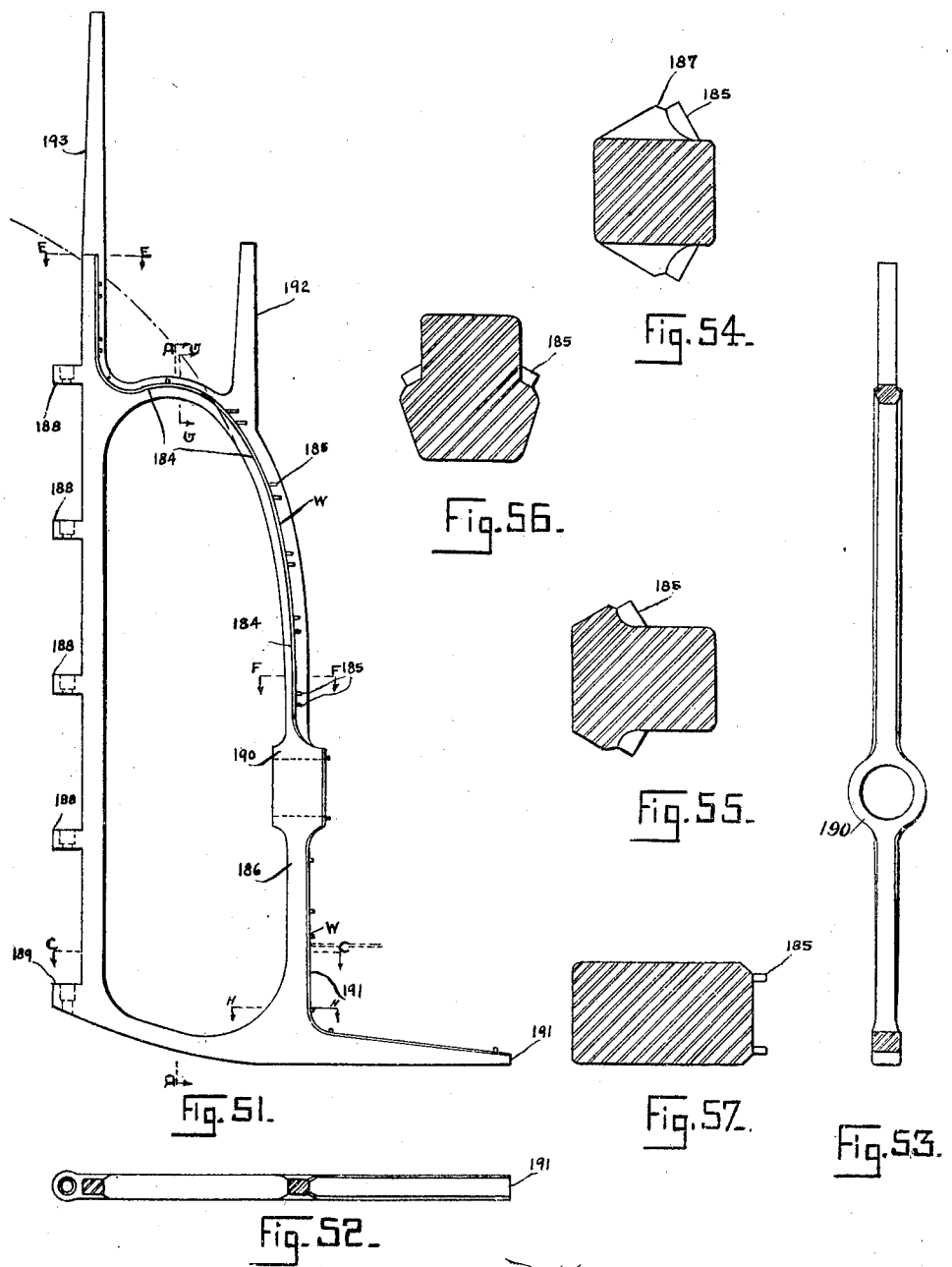

UNITED STATES PATENT OFFICE.

MYRON F. HILL, OF NEW YORK, N. Y., ASSIGNOR TO CAST STEEL SHIP CORPORATION, A CORPORATION OF NEW YORK.

SHIP.

1,376,878.      Specification of Letters Patent.      Patented May 3, 1921.

Application filed December 19, 1918. Serial No. 267,480½.

*To all whom it may concern:*

Be it known that I, MYRON F. HILL, of New York city, county, and State, have invented new and useful Improvements in Ships, of which the following is a specification.

My invention relates to ships, and particularly to standardizing the sections to one substantially typical form which is preferably continuous throughout the ship for shell, tank top, decks and bulkheads, subject merely to variations in dimensions and to a slight modification for the bilge and other minor parts. This system is of particular value when the sections are made of cast steel since it simplifies foundry work to a remarkable extent and makes it possible to build ships with the simplest foundry processes.

My invention relates to further features of construction and details which will appear in the further description.

In the drawings:

Fig. 2 shows the profile of the forward half.

Fig. 3 a profile of the after half of the ship.

Figs. 4 and 5 show the shell expansion.

Figs. 6 and 7 show the shelter deck, and the arrangement of hatchways and deck beams.

Fig. 8 shows a midship section.

Fig. 9 shows the arrangement of floors, and their relation to the tank top and outer bottom.

Fig. 10 shows the keel and the plan of assembling its sections.

Fig. 11 shows the method of welding the transverse frames to the tank top.

Figs. 12 and 13 show a method of attaching stanchions to the deck beams.

Figs. 14 and 15 illustrate sections of hatchways.

Fig. 16 shows a midship section at the boiler space.

Figs. 17 and 18 illustrate the upper deck.

Fig. 19 illustrates the bridge deck.

Fig. 20 shows the poop deck.

Fig. 21 shows the forecastle deck.

Fig. 22 shows a water tight flat forward.

Fig. 23 illustrates a midship bulkhead.

Fig. 24 shows a vertical section through a midship bulkhead.

Figs. 25 and 26 show horizontal sections through a midship bulkhead.

Figure 27:
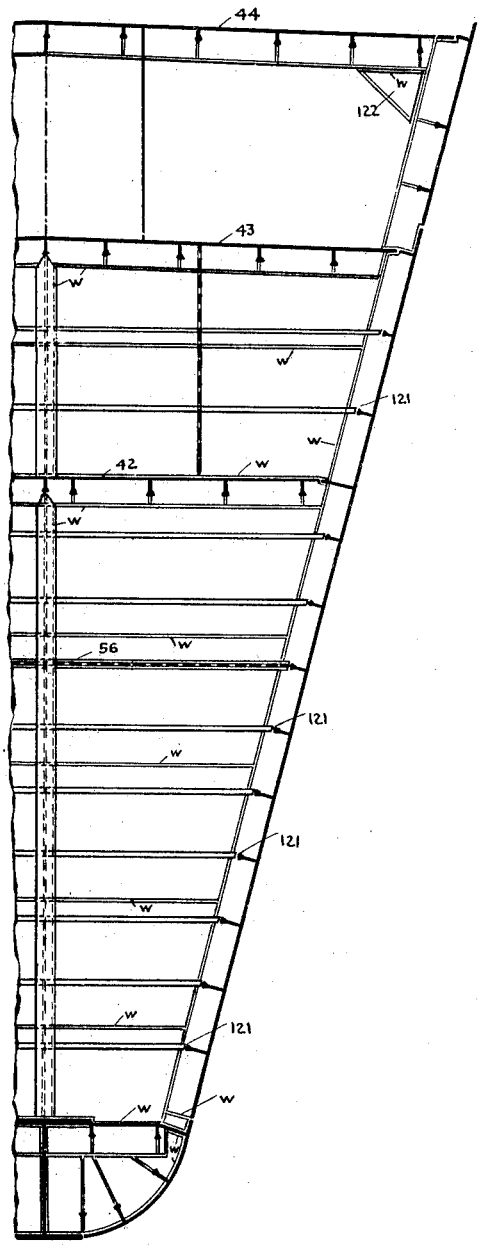

Fig. 27 illustrates a forward bulkhead such for example as the collision bulkhead.

Figure 28:
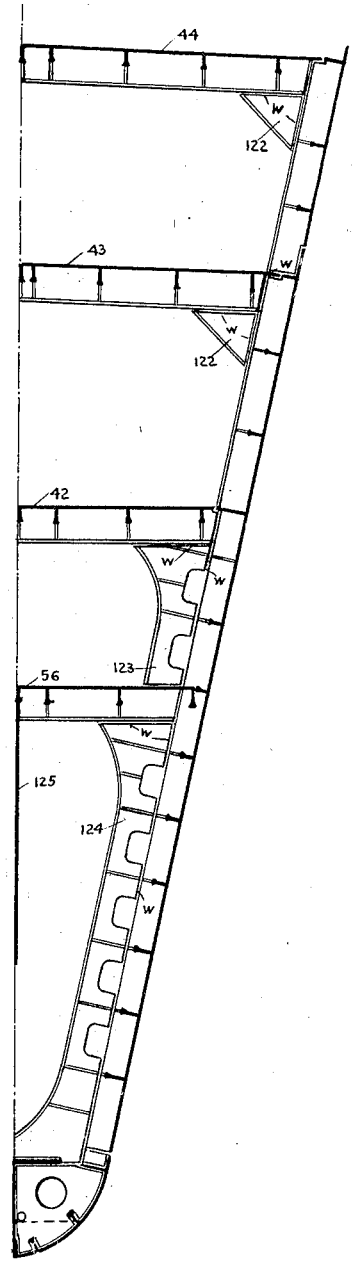

Fig. 28 shows a forward frame which departs in form from the frames in the midship portion of the ship.

Figure 29:
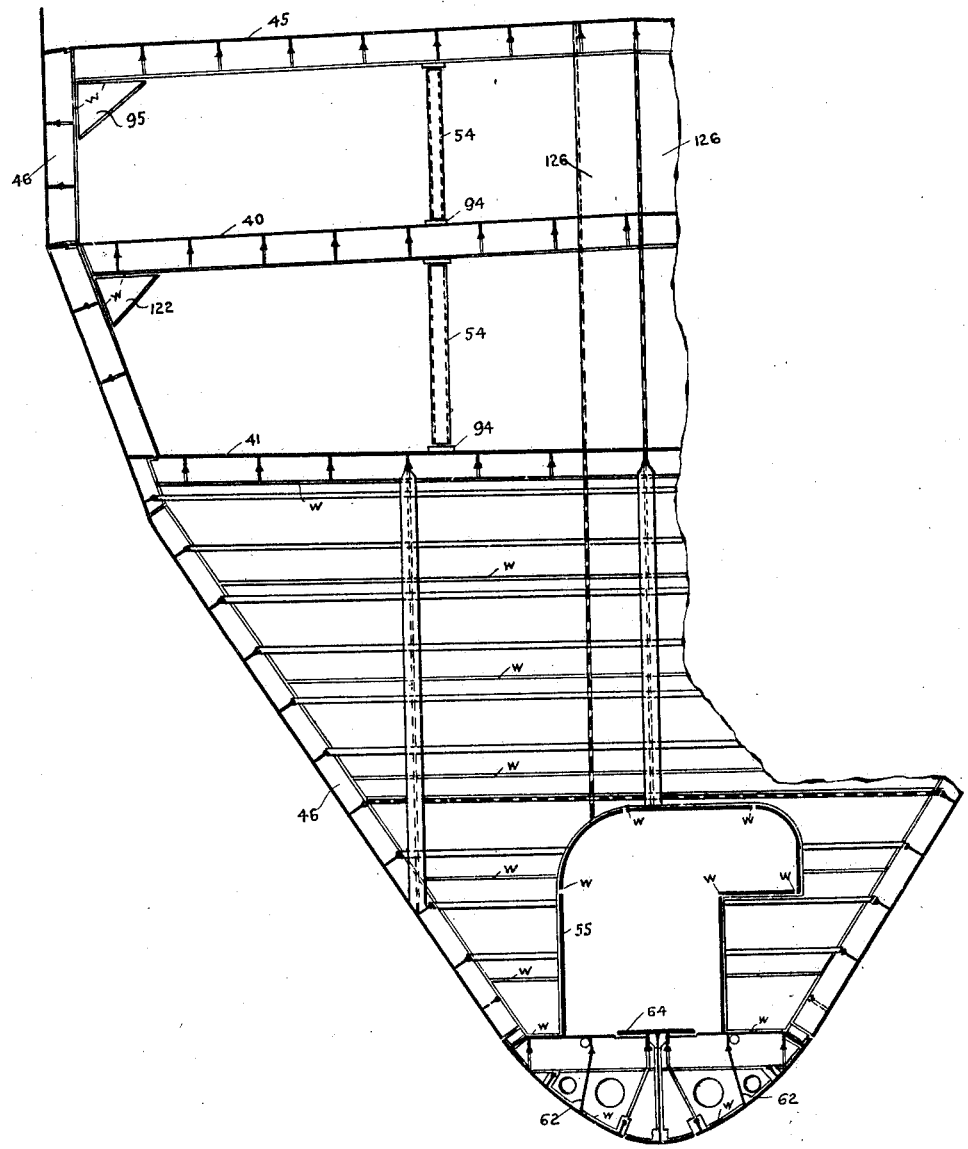

Fig. 29 shows an after bulkhead with the end of a shaft tunnel.

Figure 30:
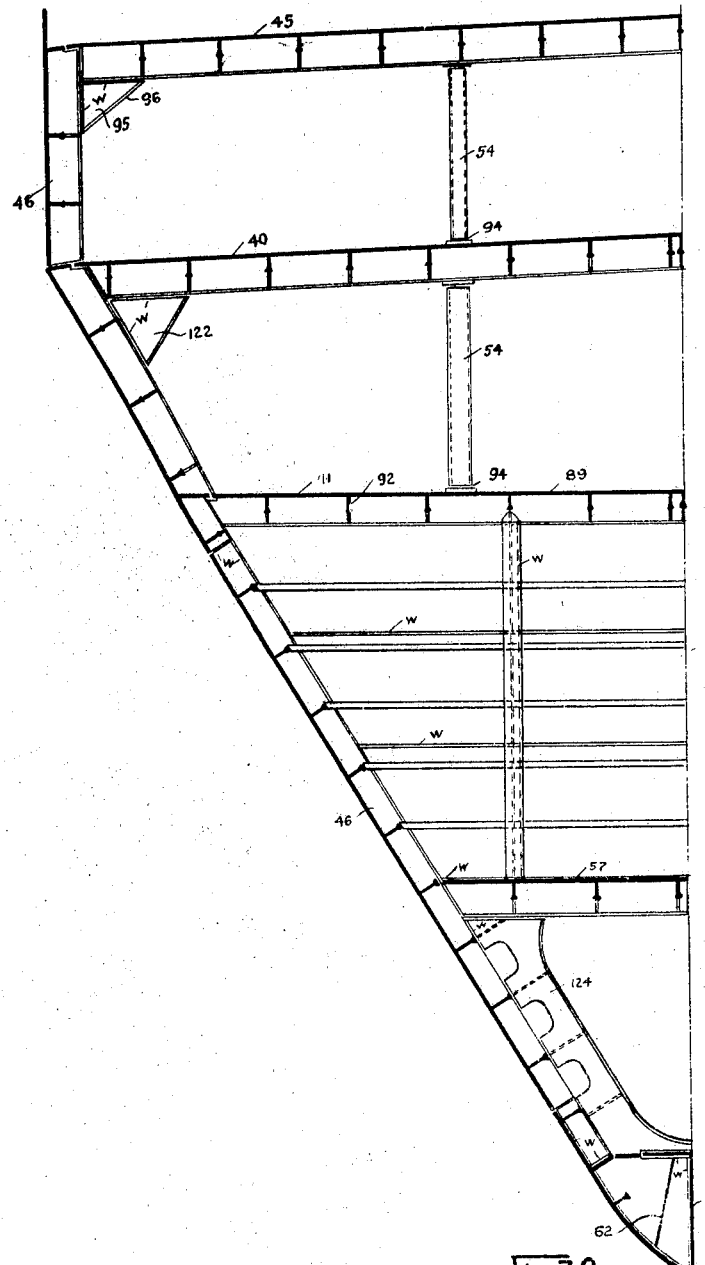

Fig. 30 shows an after frame, with a partial bulkhead and including a water tight flat.

Fig. 31 shows an after section of the ship including a partial bulkhead and a water tight flat.

Figs. 32 and 33 show the tank top.

Fig. 34 shows the detail of an intermediate floor.

Fig. 35 shows the detail of a water tight and oil tight floor.

Fig. 36 shows the detail of a partial floor in engine space.

Fig. 37 shows the typical detail of a side girder.

Fig. 38 shows the elevation of the stem with sections at various points.

Fig. 39 shows a bottom view of the stem.

Fig. 40 shows an end view of stem where it joins keel on line A—A.

Fig. 41 shows a section on line B—B.

Fig. 42 shows a typical small size casting section which when welded to other similar casting sections will form the larger sections of the ship.

Fig. 43 shows one of the larger sections of the ship cast as one unit.

Fig. 44 shows the detail of a welded joint between two casting sections.

Fig. 45 shows a typical small size casting section which is suitable for being joined to other sections by a combination of riveting and welding.

Fig. 46 shows one of the larger sections of the ship cast as one unit suitable for being joined to other sections by a combination of riveting and welding.

Fig. 47 shows the joggled lap on the end of one of these larger sections.

Fig. 48 shows the detail of a combination joint suitable for riveting and welding.

Fig. 49 shows a cross-section through one of the larger casting sections.

Fig. 50 shows the method of joining two sections by welding, where riveting is omitted.

Fig. 51 shows the elevation of the stern frame.

Fig. 52 shows the section of the stern frame on line C—C.

Fig. 53 shows the section of the stern frame on line D—D.

Fig. 54 shows the section of the rudder post on line E—E.

Fig. 55 shows the section of the propeller post on line F—F.

Fig. 56 shows a vertical section on line G—G.

Fig. 57 shows a section of the propeller post on line H—H.

Fig. 58 shows the plan of a special form of combination welded section, and stud welded joint.

Fig. 59 shows a longitudinal section through the joint shown in Fig. 58.

Fig. 60 shows a transverse section through the joint shown in Fig. 58.

Figure 1:
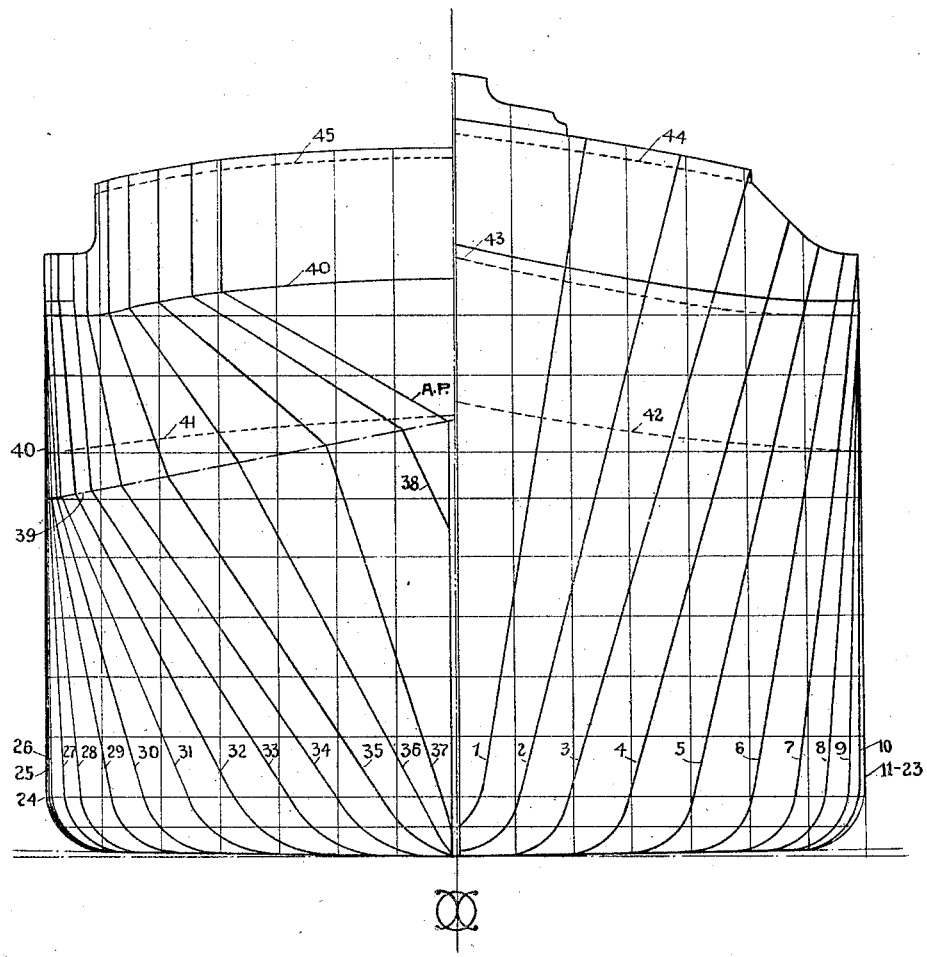
Figure 1 shows the general lines of the ship.

In the drawings, numbers 1 to 38 inclusive show transverse sections of the ship from stem to stern divided into 37 equal divisions between numbers 1 and 38, with an extra division and a fraction between number 38 and the after perpendicular, which is represented at AP. The lines along the transverses may not in final construction be perfectly straight since they are affected by the torsional warping of the sections when drawn into position, but so far as the casting system is concerned they are straight and may remain straight until warped. The curves of the forward and after castings in horizontal planes may be effected in the annealing oven or by any other suitable means. The bilge represented by the curved portion of the lines 1 to 37 may for the most part have a single transverse curvature throughout. It is of course apparent that the right hand side of Fig. 1 shows the forward body and the left hand side of Fig. 1 shows the after body. The curvature at the bilge lines 1 to 24 is preferably uniform. The curvature of lines 25 to 36 may be of larger radii if desired. It is of course apparent that the curvature of lines 1 to 24 may also have increased radii. This curvature may match the curvature of lines 25 to 36, if desired, thereby somewhat standardizing castings for these portions of the ship.

It will be noted that lines 1 to 11 approximately indicate the form from the bilge to the top of the hull. This is of course true also of the lines 11 to 24 of the middle body. The lines of the after body are modified by the two knuckles 39 and 40, the knuckle 39 being for the most part below the water level and the knuckle 40 representing the line of the shelter deck. The broken line 41 shows the location of the upper deck in the after body; the line 42 shows the location of the upper deck in the forward body. Line 43 shows the location of the shelter deck in the forward body. Line 44 shows the forecastle deck and line 45 shows the poop deck. It will be noted that these decks have a sheer, which is most desirable for ship construction but which is difficult if not impossible to obtain under the ordinary fabricating systems without losing the fabricating principle.

While Fig. 1 shows approximately the theoretical lines of the ship, the lines 46 in the other figures indicate the location of the frames of the ship. It will be noted that these lines in the forward and after bodies are somewhat inclined. This is for the purpose of maintaining uniformity in the castings, the frames being preferably normal to the shell throughout the ship. Furthermore the side frames of the ship register with the floors in the inner bottom of the ship and with the deck beams of the various decks. This is not apparent in Figs. 2 and 3 but becomes apparent in Figs. 4 and 5 where the registration between the side frames and the floors is indicated by the double lines 46 and 47. The main floors in Figs. 2 and 3 are represented by the vertical lines 76, there being a floor to register with each side frame, and for a greater portion of the ship intermediate floors between the main floors. The intermediate floors do not have to register with any side frames. In certain portions of the ship as indicated at 49, there may be additional intermediate floors for further stiffening the ship construction in accordance with the usual principles of ship building.

Hatchways 50 and 51 may be provided in the shelter and upper decks, respectively, and derrick foundations 52 of the usual type can be mounted between the hatchways. The usual superstructures 53 may be erected in any suitable way. Suitable stanchions 54 may be provided wherever desired. 55 shows the usual shaft tunnel which may be cast in sections and welded together and into place. Water tight flats, 56 and 57 may be employed wherever desired for the purpose of forming boundaries to trimming or ballast tanks of the usual type.

In Figs. 4 and 5 are shown the method of assembly of the larger shell sections. The lines 46 illustrate the transverse frames and the lines 58 represent the longitudinals of the ship as built upon the "Isherwood system."

In these figures the full lines represent the weld lines between the larger sections, on the starboard side of the ship, while the dot and dash lines represent similar weld lines on the port side. The line W 1 represents the weld between the keel and the bottom sections, W 2 the weld line between the bottom sections and the lower edge of the bilge, W 3 the weld line between the upper edge of the bilge and the side sections, W 4 the weld line at the top of the standard side sections and the sides of the forecastle, bridge and poop portions of the ship and also between the side sections and the bulwarks 59. 60 represents the collision bulkhead and 61 represents other bulkheads. In these drawings the registration between the side frames and the bottom floors are illustrated in part. In Figs. 6 and 7 is shown the deck construction showing the hatchways 50. The deck beams 97 are shown in broken lines, and the weld lines 63 between the larger sections are also shown. The arrangement of bulkheads 61 is also shown. The bulkheads in the forward and after body follow as far as possible the arrangement of deck beams and at the bottom as far as possible the arrangement of the floors so that the bulkheads register with the deck beams and the floors. It will be noted that the deck beams 97 in the forward body are normal to the shell thereby registering with the side transverse girders or frames.

In Fig. 8 is shown the midship section. Keel castings composed of H girder sections 64 may be formed as shown in Fig. 10. The different sections of the H girders may be dovetailed together as represented at 65 and the dovetailing edges where they meet corresponding parts are solidly welded together. The forward end of the keel may be welded to the stem casting and the after end of the keel to the stern frame making a solid and rigid backbone for this ship. In Fig. 8 is indicated the method of assembling the larger sections in erecting the ship as follows:—A bottom shell casting for example 66 consisting of a portion of a floor 69 and the longitudinals 70 of the "Isherwood system" extends from line 67 to line 68. A tank top casting is also illustrated at 71 extending from line 72 to line 73 and consisting of the portion 74 of the floor and the longitudinals 75. These larger castings may be made up of duplicate smaller castings as shown in Fig. 42 each including a portion of the floor 69 or 74 as may be, and one longitudinal 70 or 75 as may be, and extending forward and aft for a length equal to the distance between the center lines of the main frames 46 of the ship. Between the portions 69 and 74 may be welded similar sections or castings of metal 76 provided with stiffening clips 77, these similar portions and stiffening clips being welded to the portions of the floors 69 and 74 and to the clip portions 78 and 79 on those portions of the floors. This construction provides lightening holes 80 in the floors. Floors thus built up are dovetailed into the keel section 64 and welded solidly into place. The bilge may next be applied extending to line 81 and may be formed of similar castings or of rolled metal with the margin plate 82 and longitudinals 83 either cast with the shell, or welded to the rolled plate, as may be desired. The portion 84 of the floor may be of rolled metal welded to the other members, or it may be composed in whole or in part of cast metal, cast integral with the shell margin plate and longitudinals. The bilge sections may be cast in lengths equal to the distance between the center lines of the frames 46 as a whole, or may be cast in shorter or longer lengths in separate sections which include the portion of the members 82 and a longitudinal 83 preferably similar in length to the length of a shell section.

The side castings may be composed of larger sections extending from line 81 to line 85. These large sections may if desired be composed of smaller sections which include a portion of the transverse frame 46 and one or more longitudinals as may be desired, these smaller sections being welded together perhaps in the shop, to form the larger sections. The larger sections herein described may be cast complete, thereby eliminating the welding necessary to unite the smaller castings into larger sections. When a large side section has been erected and welded at 81 to the bilge, an inner portion 86 of the transverse frame may be united by welding to the other portion of the transverse frame 46, to the tank top 71, and to the bottom of the deck beam 87, and also if desired to a portion of the deck at 88. The deck sections 89 may be built up in the same way as the tank top and outer bottom and side sections as heretofore described and when assembled, they may be held partly in place by the stanchions 54. In order to secure the stanchions to the decks a separate casting 90 as shown in Fig. 12, or head built up of rolled metal may be employed, the bottom plate of which may be welded to the stanchion. The wings, and the top of the bottom plate may be welded to the deck beam 91 and longitudinals 92, thereby holding the stanchions to the decks. At the bottom of the stanchions plates 94 may be welded to the stanchion and deck or tank top as the case may be. The shelter deck 93 may be formed in the same manner, and in assembling, all the stanchions 54 may be similarly secured. Knees 95 may be formed of rolled steel with the edge bent over at 96, the whole being welded to the deck beam 97 and the side frames 46 to stiffen the joint.

The side frames have the usual face plates 98 and 99 to increase their strength as girders. The bulwarks 59 may be formed of rolled plate welded to the cast supports 100. The bulwarks are welded to the shell at 85 with the supports 100 welded to the shelter deck at 101. W represents the line of welding. In Fig. 9 is shown a longitudinal section of a bottom shell casting and a tank top casting. The intermediate floors and clips 48 and 102 may be formed of rolled steel with the parts welded together, or they may consist of castings having the usual lightening holes where desired, the top and bottom shell, and the tops and bottoms of the clips being welded at W to the longitudinals 75 and 70. It is possible to cast the intermediate floors with the tank top and shell with the portions 69 and 74 of the main floors, in which case the metal portions of the intermediate floors would be formed in the same way as the metal portions of the main floors shown in Fig. 8.

In Fig. 14 is shown a section through a hatchway 51 for the upper deck with the method of attachment to the deck 89 and the deck beam 91 at W. In Fig. 15 is shown a section through a hatchway 50 for the shelter deck with its method of attachment to the deck 93 and the deck beams 97 meeting it at the weld line W. A plate 103 may be added at each deck beam to strengthen the hatch coaming.

It will be noted that the hatchways in any deck may be uniform throughout the ship if desired, so that a single casting for the shelter deck hatchways may be utilized, and for the upper deck hatchways another casting may be utilized which may be standard for the upper deck. In Fig. 16 is shown a modification of the midship section for the boiler and engine space. The upper deck section 104, corresponding to the upper deck section 89 in Fig. 8, is bent at 105 (the deck beam being cut off to the right of 105) so that it lies in an inclined position, the inner edges being adapted for welding at W to the coaming 106 of the hatchway. Inclined beams 107 are adapted for use with this construction in the boiler space where a greater depth of hold is required, which lie between the ends of the larger deck sections and are welded thereto. An additional supporting stiffener 108 may be welded to the beam 107 and to the deck beam 97 of the shelter deck. The inner edge of the deck is cut off and welded to the coaming as shown. An additional frame 109 may be utilized to stiffen this construction being welded to the shelter deck, the coaming, and the deck beam 110 of the bridge deck. Any suitable superstructure metal work 53 may be welded or otherwise added as indicated.

In Figs. 17 and 18 is shown the upper deck, the deck beams being indicated by double broken lines 91, with the larger deck sections welded together at the full lines. It will be noted that the weld line is sometimes forward of the deck beam and sometimes aft. The transformation line is indicated by the two weld lines 111, a separate I beam girder being utilized to fill in the space between sections at the point of transformation. This contruction is to facilitate the assembling of standard sections and to maintain the uniformity of longitudinals on the port and starboard sides of the ship.

In Figs. 6 and 7 the method of construction for the shelter deck, as shown, is similar to that shown for the upper deck in Figs. 17 and 18, the deck beams being shown in double broken lines 97 with the larger deck sections welded together at the full lines.

It will be noted that the standard sections as used for the shell, tank top and decks in the forward and after bodies are generally trimmed off at different angles according to their location. The sections are not trimmed upon the side along which the portion of the transverse frames, floors, and deck beams are cast, since it would be impossible to trim these edges to any considerable angle without cuting off these members. The other edges may be trimmed as required without affecting the frames, deck beams and floors.

Fig. 23 shows a typical bulkhead for the midship portion of the ship. The system of assembly is similar to that shown for the shell sections in Figs. 4 and 5, except that in order to bring the vertical stiffeners under the deck longitudinals the large sections are of slightly different width than the shell sections. The weld lines are shown at 112. The bulkhead plating is thinner than shell plating and the thickness may be graduated from the top of the bulkhead to the tank top according to the water pressure, the thicker plating being at the bottom where the pressure would be greatest if a compartment was flooded. Above the upper deck rolled plate may be used if desired with the stiffeners welded on, in case it is found impracticable to cast to the necessary degree of thinness. The system of bulkhead stiffening is horizontal with the stiffeners increasing in depth toward the bottom where the water pressure is greatest and framing into two vertical girders on each side of the center line. It will be noted that the larger sections can be shifted for the opposite side of the ship, any variation in width coming in the outside sections. The larger sections may in turn be built up of smaller sections. The bulkhead is bounded by lines 113, 114, 115, 115ª where it is respectively welded to the transverses and beams cast with the shell, upper, shelter deck, and tank top. The bulkhead may be made water tight or oil tight by calking as required. At the ends of the boiler or engine hatches a partial bulkhead casing may be fitted as shown at 116 with vertical stiffeners of proper size welded thereto. The floors in way of bulkheads are similar to water tight and oil tight floors as shown in Fig. 35. Where no plating is required, such as between the shelter deck and bridge, the construction is as shown for the midship section. Fig. 24 shows a vertical section at line A—A. The portion 117 is welded to the portion cast with the bulkhead plating at line marked W. The stiffener is widened out at the upper deck and tank top to form an effective connection thereto and stiffen the ship in a longitudinal direction. Above the upper deck 89 the vertical girder is welded directly to the plating and well bracketed where connection is made to the engine or boiler casing as at 118.

Figs. 25 and 26 show horizontal sections at lines B—B and C—C, respectively, with the method of framing the bulkhead section to the shell at 119 and 120.

Fig. 27 represents a forward bulkhead such as the collision bulkhead which is located near the stem. The method of assembly is similar to a midship bulkhead except that it may be desirable to use rolled plate throughout and weld all stiffeners thereto, in order that the horizontal bulkhead stiffeners may be spaced so as to register with the shell stiffeners at 121.

Fig. 28 shows a typical forward frame. The brackets 122 are shaped to the proper angle to fit between the deck beams and transverses and are welded thereto at places marked W. Below the upper deck 42 extra transverses 123 and 124 are welded to the transverses cast with the shell section at W. These transverses are similar to those used in the midship portion of the ship but are lengthened, by welding in an extra piece, or cut off as circumstances require. Trimming is necessary at the ends owing to the inclination of the ship's sides. A water tight flat 56 is fitted below the upper deck 42 forming the top of the forward trimming tank, and a swash plate 125 is suspended therefrom.

Fig. 29 shows an after bulkhead with the shaft tunnel 55 framing into same. The construction is similar to that shown for a forward bulkhead in Fig. 27, the horizontal stiffeners registering with the shell longitudinals. The bulkhead plates are welded together at W. An escape and ammunition trunk 126 is shown on the after side of the bulkhead.

Fig. 30 illustrates an after frame with a partial bulkhead between the upper deck 41 and water tight flat 57. Fig. 31 illustrates a typical after frame in way of the knuckle and shows a partial bulkhead 127 which forms the forward boundary of the after peak tank below the water tight flat 57.

Figs. 32 and 33 show the tank top or upper boundary of the inner bottom. It will be noted that the larger sections 71 are the same on both the port and starboard sides of the ship throughout the middle body, simply being reversed. This brings the weld lines W between sections on the opposite sides of the floors 74, in opposite sides of the ship. In the forward and after bodies the floors are normal to the shell preferably with the weld lines on the same side on the two sides of the ship. At the points of transformation 128 and 129 an extra piece with part of floor cast on is welded in between sections. The doubling plates 94, to take the bases of stanchions, are welded to the tank top on lines W. The margin plate 82 is shown separate from the tank top sections, which are welded thereto at W, but if found desirable these margin plates may be cast integral with the tank top and welded to the shell. Water tight and oil tight floors are shown at 130. Manholes 131 are as indicated.

Figs. 34, 35 and 36 illustrate floors of different types. In Fig. 34 is shown an intermediate floor with lightening holes 132 and clips 102. This floor is notched out at 133 to fit around the tank top and outer bottom longitudinals. The spaces formed by the notches also act as passages for the circulation of water and those at the top for air circulation. These floors are welded to the outer bottom, tank top and keel at W. Fig. 35 shows a typical water tight or oil tight, intermediate floor. This is similar to the floor shown in Fig. 34 except that no openings appear. Small pieces of metal may be welded in at 134 to close up the openings, formed by the tank top, outer bottom and shell at W. The proper degree of watertightness or oil-tightness may be obtained by calking the welded joints where necessary. Fig. 36 shows a partial floor in the engine space. These are extra floors fitted between the main and intermediate floors to provide extra support under the engines. Lightening holes are shown at 135 and notches around longitudinals at 136. These floors are welded to the tank top outer bottom, and keel at W.

Fig. 37 shows a typical section of a side girder, 62. There are two side girders, in each side running throughout the major portion of the length of the ship, and a third is added for a short distance in the extreme after portion of the ship. These side girders ordinarily weld between, and to the bulbs of the tank top and outer bottom longitudinals at W. In the extreme after portion of the ship they may however be welded directly to the tank top or outer bottom or both with the longitudinals omitted if desirable. Two lightening holes are provided between a main and intermediate floor as indicated at 137. Forward and aft where the floors are spaced more closely together one lightening hole may be omitted. The side girder plates are fitted between floors and welded to the floors and floor stiffeners at W.

Figs. 38 to 41 inclusive illustrate the details of the stem. Fig. 38 shows a side elevation with cross sections indicated at points 138, 139, 140 and 141. Fig. 39 illustrates a bottom view of the stem showing the taper. Fig. 40 shows a cross section at the end of the stem on line A—A where it is welded to the keel. Fig. 41 shows an enlarged cross section on line B—B. It will be noted that a web 142 is cast on to the stem sections at frequent intervals to provide extra transverse strength. Lugs 143 are cast on to the stem as indicated to receive the shell plates which are welded to the stem casting at 144. At least two lugs are provided for each small shell section. The section shown in Fig. 41 is the same from line B—B to the top of the stem, but below line B—B, which represents the load water line, the section conforms to the contour of the different water lines in order to obtain a flush surface without knuckles. At the lower end of the curved portion at 145 a center line web is introduced to which the vertical web of the H girder which forms the keel, is welded, making the keel continuous with the stem. Breast hooks are indicated by dotted lines at 146 and the forward floors at 147. A possible scarph is indicated at 148.

Fig. 42 illustrates the detail of a standard smaller section which forms part of larger sections used in assembling the shell, tank top, decks, and bulkheads for a welded ship. It will be noted that a double bevel is shown along the edges at 149. A similar edge is formed on the adjacent castings so that the castings are welded together on both sides as at 150 in Fig. 44. A longitudinal or stiffener 151 and a portion of a transverse 152 are cast with the plating 153. Longitudinal 151 projects beyond the edge of the plate at 154. This is for the purpose of forming a stop or rest for the next adjacent section during assembly as well as to make a stronger joint. Longitudinal 151 has a bulb cast on the lower edge through which the metal is poured by means of a gate leaving the form illustrated at 155, the bulb being preferably nearly circular in cross section. Fig. 43 shows a larger section and the size of these sections may be increased if desired, to include several gates; each longitudinal having a gate. Lugs 155ª are formed in the vents in the mold and are cut off during trimming as are also the forms 155 at 155ᵇ.

Fig. 45 illustrates the detail of a standard smaller section which forms part of larger sections used in assembling the shell, tank top, decks, and perhaps bulkheads for a ship whose sections are joined together by a combination of seam welding and welded studs in the nature of rivets. Two of these smaller sections are joined together at 166 where a joggled lap is formed on two sides of the casting which allows the edge of the adjacent castings to rest upon these laps, thus forming a flush surface on one side of of the plating. The joints are formed as shown in detail in Fig. 48, by casting studs on the edges of the sections preferably the edges which are not joggled. These fit loosely into corresponding holes in the joggled part and the studs are welded into the holes in the joggled lap at 167. Additional seam welding is provided at 168 and also at 169 if necessary to increase the strength and develop water-tightness in the joint. A longitudinal 170 and portion of a transverse 171 are cast with the plating 172. Longitudinal 170 projects beyond the edge of the plate at 173 where a similar combination of welded seam and stud welded joint is made to connect the adjacent castings. The longitudinal has a bulb cast on the lower edge through which the metal is poured by means of a gate leaving the form shown at 174, the bulb being preferably nearly circular in cross section. At 175 the bulb has wings cast upon it with studs to form a combination seam and stud welded connection with the adjacent cast lugs at 176 having holes to receive the studs. At 177 where transverses of two sections join, the joint may be simply welded by a double V joint as shown in Fig. 50 or lapped and stud welded if desired. The joggled laps are cut off at 178 to avoid three thicknesses overlapping where the corners of three sections join. To make this corner water tight the joint may be welded. On any one casting section the diagonally opposite corners are the ones so cut.

Figs. 46 and 47 show a larger section which may be cast if desired. The size of these sections may be increased to include several longitudinals, pouring the casting through several gates as indicated. Fig. 49 illustrates a cross section through one of these larger sections and shows the details of the wings cast on the bulbs at the ends where connection is made to a lug on an adjacent casting. The studs which are cast on the plates are shown at 179, and the holes to receive them are shown at 180. The lugs 176 and 181 may be bent during assembly where desired and bent back after assembly for welding. Lugs 182 are formed in the vents in the mold and are cut off during trimming as are also the forms 174 at 183.

It will be noted that in Fig. 47 the joggled lap 166 is located close to the longitudinal 170. This arrangement is preferable wherever it can be used to stiffen welded joints in the shell, as it relieves the "welded in" material to a considerable extent of a tendency to failure by fatigue, caused by repeated panting strains on the parts of the shell exposed to wave action. It is also desirable to locate all welded joints in decks, tank top plating and bulkheads near longitudinals, stringers, frames or stiffeners as such parts of the ship are exposed to similar strains due to variable water pressure or variation in pressure of cargo within the ship.

Figs. 58, 59, and 60 illustrate the details of a special form of combination welded seam and stud welded joint which may be used where great strength is required. This joint may develop any degree of strength, even a strength greater than the tensile strength of the plate itself, if desired. Studs 194, which are slightly undercut, fit loosely into corresponding slots 195 in the adjacent casting, the intervening space being filled in by welding. The space between the slots is thickened up at 196 in way of the lap. The length of the studs may be varied to obtain a joint of any prescribed strength, and in order to make the joint of uniform strength, the spacing of studs should be such that the amount of metal between adjacent slots is equal to three-fourths the area of one stud. This will make the tensile strength of the plate containing the slots equal to the shearing strength of the studs. Additional welding is provided for at 197, to fill up the groove, and make the seam suitable for calking.

The inclination of the mold should be such as to maintain the stream of metal flowing in the bulb channel as near its full size as possible until the metal reaches the far end of the mold. If the metal should be poured downward vertically, the stream, owing to its speed increment would be attentuated, and perhaps finally assume the form of drops and when it struck the far end of the mold it would splash and the particles being small would chill quickly and form "cold shots" in the mold; that is, portions of the metal would not unite integrally with other portions.

If on the other hand the bulb channels should lie in a horizontal position it would not serve its purpose in conveying the stream of metal through the channel properly to the other end of the mold since part of the metal would rise up into the web in the attempt to flow to the other end which would have the effect of pre-chilling the web portion owing to the thin section and cause "cold shots." Hence it is desirable that the bulb channel should be inclined to such an angle as to maintain the stream as near its full size as possible so as to fill the channel without rising up into the web portion until the stream reaches the far end of the mold after which the mold fills up beginning at the far end until finally the upper and nearer end of the mold is filled.

The chilling trough around the bulb channel is preferably lined with sand sufficiently deep to prevent the molten metal from being abnormally chilled while it is flowing through the bulb channel and yet sufficiently thin to draw the heat from the metal more rapidly than sand would draw it after the metal has stopped flowing. The gate entrance provided for guiding the metal into the bulb channel is preferably curved so as not to impede its flow any more than necessary and is of such cross sectional area as to prevent too much of a stream entering the bulb channel.

This arrangement of the mold facilitates free escape of gases from the mold through the vents on the upper edges of the casting and as the metal fills up the webs of the ribs and the sheet portions of the mold, the top surface of the metal remains in liquid condition throughout the pouring period allowing for the free escape from the molten metal of such gases as may be generated in the steel during the cooling period due to chemical action.

The metal is preferably rendered inert before pouring. This may be accomplished by any of the usual methods such for example as throwing aluminum or ferro titanium into the ladle as the metal is poured from the furnace.

Electric steel, that is, steel made in an electric furnace, having a low oxygen content due to being melted in an inert atmosphere, or an atmosphere in which the oxygen has been combined with carbon to prevent it from getting into the steel, is preferable. This method of casting however, makes it possible to get better results from any kind of molten metal than is possible in those molds where the top of the casting becomes congealed before the gases generated have an opportunity to escape. My mold and method of pouring provides the free escape for substantially all the gases that are generated in the steel, or that may be in the mold and produces a casting that is solid and dense.

Since the casting has a flat portion with ribs preferably laying in two different directions, and has even sections throughout in the plate and web portion and the bulb portion is cooled faster than it would ordinarily cool in such a mold to keep up with the rate of cooling of the thinner portions of the castings, buckling and warping is substantially eliminated.

The casting made in such a mold may be cut and trimmed by an oxy-acetylene flame or any other desirable mechanical operations to fit in the different portions of the ship and if the casting in a given mold fails to fit because of open spaces left between the castings as assembled in a ship, portions of rolled metal may be fitted between them and welded or otherwise secured in position.

In casting it is necessary to provide artificial means for cooling the bulb by a chill as indicated at 179ª in Fig. 49 as naturally the bulb being of larger sectional area than the web will cool more slowly and a tendency to split the casting will exist.

Figs. 51 to 57 inclusive, illustrate the details of the stern post. Fig. 51 shows a side elevation, Fig. 52 shows a section on line C—C and Fig. 53 shows a section on line D—D. The stern post is similar to an ordinary cast stern post for a single screw ship with some modification to adapt same to a cast steel ship. Line W in Fig. 51 represents the weld line to take the shell plating, the sections of which may be trimmed to the contour shown at 184. Lugs 185 are cast on the propeller post 186 to form stops or rests for the shell castings. At least two such lugs are provided for each shell section. Fig. 54 shows an enlarged section on line E—E this being the point where the counter of the ship intersects the rudder post. Above line E—E the cross section is as shown by hatching. Below line E—E and throughout the propeller post (see Fig. 55), except at boss, the cross section includes the ears 187 which conform to the shape of the ship, such that a flush surface without knuckles is formed where the shell plating welds to the stern frame. Fig. 55 shows an enlarged cross section through the propeller post on line F—F. Fig. 56 shows an enlarged cross section through the arch of the stern frame on line G—G and Fig. 57 shows an enlarged cross section through the propeller post on line H—H. The gudgeons are shown at 188 and 189 and the boss for the shaft at 190. The keel is welded to the stern post at 191 and the stern frame is welded to deep floors at 192 and 193.

All the larger sections are so designed as to be standardized and to have added to them by welding or casting smaller sections where necessary for extending or trimming in the forward or after bodies. The assembly of sections for the bridge deck is shown in Fig. 19, that for the poop deck, in Fig. 20, that for the forecastle deck in Fig. 21 and that for the forward water tight flat in Fig. 22. Sections of the latter decks may, if desired, be welded together by single V joints from above during the erection of the ship to facilitate automatic welding with portable automatic arc welding instruments adapted to rest upon the decks along the welding seams. The other portions of the ship may be welded by double V joints, or by T joints where the longitudinals butt against the deck beams, or transverse frames or floors. Welded joints, except the external portion of the shell may be thicker than the plating to provide a strength greater than that of the surrounding metal, thereby making it possible to reduce the thickness of the surrounding metal below what is required for a riveted ship. The method of construction shown eliminates rivets, connection angles and many bracket connections heretofore necessary in ship construction.

A steel ship, having a dead weight carrying capacity of 9600 tons, with riveted construction has net weight of hull of approximately 2400 tons. Eliminating connection angles and rivets brings the weight of the hull down to about 2050 tons, and a further saving of 10% or more of this amount may be made by reducing the weight of the shell, frames, etc., due to the fact that in a riveted ship these members have to be increased in thickness beyond necessary strength requirements on account of the efficiency of the riveted joints being less than the members themselves. In this ship the joints may be of the full maximum strength of the shell plating and frames and those members as well as some others may be correspondingly lighter in weight. This makes it possible for a cast steel ship, or a ship built of welded sections of rolled metal, to be some 500 or 600 tons lighter than a riveted ship, thereby reducing the cost of the ship and the weight of hull and increasing the dead weight carrying capacity as normally calculated in present day practice by a similar amount so that the 9600 tons becomes 10200 tons or more. This greatly increases the efficiency of the ship.

If desired, the outside shell seams may be calked or hammered by pneumatic hammers to eliminate any possible porosity in welding. Any porosity of casting may be similarly treated and, if desired, welded at necessary spots to cure any casting defect.

I prefer to weld this ship with the electric arc and particularly with a portable automatic arc welding machine. While I have designed this ship with particular relation to casting, it is possible to build it up of rolled metal as for example; a side section may consist of one or more sheets of rolled metal for the shell with rolled bulbs or rolled angles welded thereto to form the frame work, and the larger sections may be united together according to the system herein shown, to form the ship.

It is quite possible to build the ship in a series of major divisions, say 13: (see Figs. 4 and 5) the first division extending from the stem to point 166, the second division from 166 to 167, the third division from 167 to 168, the fourth division from 168 to 169, the fifth division from 169 to 170, the sixth division from 170 to 171, the seventh division from 171 to 172, the eighth division from 172 to 173, the ninth division from 173 to 174, the tenth division from 174 to 175, the eleventh division from 175 to 176, the twelfth division from 176 to 177, the thirteenth division from 177 to the stern. The bilge joints in these divisions may be flush with other shell portions. These divisions may be separately assembled upon the platforms and welded together. If desired the internal equipment of the various divisions may be installed as they are built up and the dividing lines between the divisions then welded together, thereby welding all the divisions into a complete whole. During the process of the manufacture of ships there may be a number of divisions for one portion of several ships erected in series separately. Gangs may be employed to construct each division, trained to their own particular work and when the final assembling is accomplished the ship may be properly put into the water by any suitable means either by launching on ways or in case the platforms are on flat boats by sinking the flat boats under the ship, floating the ship off, and then raising the flat boats for a repetition of the process.

While I have described my invention in the form in which it seems preferable to construct it, I do not limit myself to the particular details shown for they may be varied without departing from the fundamental idea of the ship, nor do I limit my invention to electric arc welding, for sections can be united by any suitable means. In fact the ship may be manufactured by assembling the sections and uniting them by any suitable means now known or that may be hereafter devised by way of improvement.

What I claim is:

1. A ship's hull converging at its forward and after portions and comprising sections of uniform type joined edge to edge, exteriorly and overlapping interiorly.

2. A ship's hull converging at its forward and after portions and comprising sections of uniform type provided with interlocking joints at their adjoining edges.

3. A ship's hull converging at its forward and after portions and comprising sections of uniform type provided with interlocking welded joints.

4. A ship's hull of the class described, comprising sections of cast metal including a plurality of duplicate sections composed of a portion of the plating of the hull having frame members corresponding thereto, including the webs of the frames cast integrally therewith and having intermediate smaller ribs lying between said frames, cast integrally with the shell plating.

5. A ship's hull, including side portions adapted to be twisted as units, into a curved and flared end of a hull, the bottom portions trimmed to be joined to the side portions, the portions including a plurality of segments of uniform width.

6. A ship's hull converging at its forward and after portions and comprising sections of uniform type, each section having internal frames, said frames being normal to the shell.

7. A ship's hull including side portions adapted to be twisted as units from the flat into a curved and flared end of a hull, the bottom portions trimmed to be joined to the side portions, the portions including a plurality of originally flat segments of uniform width.

8. A ship's hull including side portions adapted to be twisted as units from the flat into a curved and flared end of a hull, the bottom portions trimmed to be joined to the side portions, the portions including a plurality of originally flat segments of uniform width and length.

9. A ship's hull converging at its forward and after portions and comprising shell sections of uniform type, and including originally straight transverse stiffeners, having said stiffeners warped with the shell.

10. A ship's hull converging at its forward and after portions and comprising sections of uniform type, and including originally straight transverse stiffeners, said frames being welded edge to edge.

11. The combination claimed in claim 4 having the inner edges of said ribs provided with bulbs.

12. A ship's hull consisting of a plurality of uniform cast steel sections, adapted to be joined edge to edge exteriorly and to overlap interiorly.

13. A ship's hull including side portions adapted to be twisted as units into a curved and flared end of a hull, the bottom portions trimmed to be joined to the side portions, the bilge portions joining said sides and bottom, the portions including a plurality of segments of uniform width.

14. The combination claimed in claim 4 having portions of frames or ribs of one section overlapping the plating of another section.

15. A ship's hull of the class described comprising sections of cast metal including a plurality of duplicate sections composed of a portion of the plating of the hull having frame members corresponding thereto, including the webs of the frames cast integrally therewith, the frame members upon each section overlapping the edges of a joining section to register the edges of the sections for joining them together.

16. A ship's hull comprising sections of cast metal provided with alining means between their edges to effect accurate registration preparatory to welding.

17. A ship containing a plurality of castings each having a sheet portion, the edges of one joined to the edges of others and rib portions similarly joined, each rib portion including a bulb on an edge of the rib to provide a chord of a grider or frame for said rib and providing a channel in the mold to pour the metal through.

18. A ship containing a plurality of castings; each having a sheet portion, the edges of one joined to the edges of others, and a plurality of rib portions, the ends of ribs on one casting joined to the ends of ribs on adjoining castings, the ribs being provided with bulbs to form channels for the flowing metal, and providing strong chords for said ribs considered as girders or ship frames.

19. The combination claimed in claim 18 having said ribs substantially parallel.

20. The combination claimed in claim 19, having a rib near one edge of said casting crossing the axes of the bulbed ribs.

21. The combination claimed in claim 19, having the castings long and narrow in general form, and the bulbed ribs crossing the shorter dimension, said ribs acting as longitudinal frames in a longitudinally framed ship.

22. The combination claimed in claim 20, having the castings long and narrow and forming a part of a strake, and having the said rib near one edge acting in the nature of a transverse frame.

23. A fabricated ship hull including a plurality of similar cast steel sections joined together at their edges, each section having a shell portion and a plurality of integral stiffening rib portions, said rib portions being cast integrally with the shell portions in each section at substantially the same angle in a converging end of the hull.

24. A fabricated ship hull including a plurality of similar cast steel sections joined together at their edges, each section having a shell portion and a plurality of integral stiffening rib portions, said rib portions being cast integrally with the shell portions in each section at substantially the same angle in a converging end of the hull, the sections being joined together at their edges by welding.

25. A fabricated ship hull including a plurality of similar cast steel sections joined together at their edges, each section having a shell portion and a plurality of integral stiffening rib portions, said rib portions being cast integrally with the shell portions in each section at substantially the same angle in a converging end of the hull, the rib portions of said sections being parallel to each other.

26. A fabricated ship hull including a plurality of similar cast steel sections joined together at their edges, each section having a shell portion and a plurality of integral stiffening rib portions, said rib portions being cast integrally with the shell portions in each section at substantially the same angle in a converging end of the hull, each section being provided with a single rib portion at right angles to the first mentioned rib portions.

27. A fabricated ship hull including a plurality of similar cast steel sections joined together at their edges, each section having a shell portion and a plurality of integral stiffening rib portions, said rib portions being cast integrally with the shell portions in each section at substantially the same angle in a converging end of the hull, said rib portions being provided at their edges with enlarged bulbs.

28. A fabricated ship hull composed of a series of cast steel units, each unit including a portion of the shell plating of the ship and a frame girder, said units being welded at their edges into continuous shell plating and continuous girder members, said girder members being normal to the shell plating.

29. A hull for a fabricated ship, composed of a plurality of cast steel shell sections of uniform type in the forward, middle and after bodies, each section including integral shell plating and side frame girders, the side frame girders of each section at the forward and after bodies of the ship being substantially at right angles to the shell plating.

30. A fabricated cast steel ship including a plurality of sections having integral shell and frame members, the frame members of said sections being substantially normal to the shell members.

31. A fabricated steel ship shell consisting of a plurality of cast steel plates joined together at their edges with overlapping joints, one of each two meeting edges being joggled, said ship having a flush exterior surface.

32. A fabricated steel ship hull having a shell and transverse stiffeners, said ship hull being characterized by the fact that the angles between successive side transverse stiffeners and the shell at their points of connection to the shell are substantially identical in a converging or curved end of the hull.

33. A joint for connecting two cast steel ship plates in which portions of the edge of one plate overlap the edge of the other plate, said plates being welded together at said overlapping edges, and presenting a flush outer surface.

34. A joint for connecting two cast steel ship plates lying in substantially the same plane, in which one of said plates is provided with an opening and the other of said plates is provided with a projection loosely fitting said opening, said plates being welded together by depositing welded metal in the cavity between said projection and the surrounding opening.

35. A joint for connecting two cast steel plates provided with joggled edges, the edges of said plates being adapted to interlock one with the other when arranged side by side, in which one of said plates is provided with an opening and the other of said plates is provided with a projection loosely fitting said opening, said plates being welded together by depositing welded metal in the cavity between said projection and the surrounding opening.

36. A joint in which one of the plates is provided with a cavity and the other with a projection loosely fitting said cavity in which said projection and cavity are of elongated form and lie at an angle to the line of the welded joint.

37. A ship's hull consisting of a plurality of sections, each section comprising a plate portion and a joggled lap portion, said lap portion being of larger cross section than the plate portion.

38. A ship's hull consisting of a plurality of castings, having seam and stud welded joints.

39. A ship's hull of the type described comprising a plurality of castings, each casting having an edge portion provided with an opening and an edge portion provided with a stud, the end portion of the casting having the opening being thicker than the body of the casting.

40. A ship's hull comprising a plurality of castings, each casting having an edge provided with a stud to register, with a casting having an edge provided with a cutout, the portion of the casting having cutout being reinforced to compensate for the aforesaid cutout.

41. A ship's hull converging at its forward and after portions and comprising sections of uniform type, provided with interlocking joints at their adjoining edges.

42. A ship's hull converging at its forward and after portions and comprising sections of uniform type provided with interlocking welded joints.

43. A ship's hull including side portions adapted to be twisted as units into a curved and flared end of a hull, the bottom portions trimmed to be joined to the side portions, curved bilge portions having a substantially uniform transverse curvature joining said sides and bottom, the portions including a plurality of segments of uniform width.

44. A ship's hull converging at its forward and after portions, comprising hull sections of uniform type in the forward, middle and after bodies, including side and bottom sections and bilge sections, intermediate to the said side and bottom sections, each section including portions of the plating and frame girder, united together at their edges into continuous plating and girder members.

45. A ship's hull converging at its forward and after portions, comprising hull sections of uniform type, including flat side and bottom sections and bilge sections, intermediate said side and bottom sections, said bilge sections being curved transversely of the hull, each bilge section having shell and girder portions registering with and at their edges, united to the corresponding edges of said side and bottom sections.

46. A ship's hull including side portions adapted to be twisted as units into a curved and flared end of a hull, the bottom portions trimmed to be joined to the side portions, the bilge portions joining said sides and bottom, the portions including a plurality of segments of uniform width and length.

47. A ship's hull including side portions adapted to be twisted as units into a curved and flared end of a hull, including a plurality of plates, and a plurality of transverse frames having originally similar profiles at their plate edges joined to said plates.

48. A ship having a hull converging at its stem and stern and provided with bulkheads, said hull and bulkheads comprising sections of uniform type, each section including plating and frame girders united together at their edges into continuous plating and girder members.

49. A ship having a hull converging at its stem and stern and provided with bulkheads, said hull and bulkheads comprising sections of uniform type, each section including plating and frame girders united together at their edges into continuous plating and girder members, said sections located with their minor dimensions transversely of the hull.

50. A ship having a hull converging at its stem and stern and provided with a tank top, said hull and tank top comprising sections of uniform type, each section including plating and frame girders united together at their edges into continuous plating and girder members, the girder portions of the hull, bottom and tank top being united to form floors, and flooring intermediate to hull, bottom and tank top girder, uniting said bottom and top.

51. A ship having a hull converging at its stem and stern and provided with a bottom and tank top, said hull, bottom and tank top comprising sections of uniform type, each section including portions of plating and longitudinal girders, united together into continuous plating and girder members, said bottom and tank top girder members being united together into side girders.

52. A ship's hull including deck and hatchway, the hatchway frame being welded to the deck members.

53. A ship's hull converging at its forward and after portions and comprising hull sections of uniform type, each section including portions of the shell plating and frame girders, said girders being normal to the shell.

54. A ship's hull converging at its forward and after portions and comprising sections of uniform type, each section including shell plating, provided with interlocking joints and frame girder normal to the shell.

55. A ship's hull converging at its forward and after portions and comprising hull sections of uniform type, said hull provided with transverse frames integral with the sections and normal to the shell.

56. A ship's hull converging at its forward and after portions and comprising sections of uniform type, including flat side and bottom sections, each section having a girder integral therewith and normal to the shell.

57. A ship's hull converging at its forward and after portions, comprising hull sections of uniform type including flat side and bottom sections and bilge sections, intermediate said side and bottom sections, each bilge section having shell and girder portions registering with and at their edges, and united to the corresponding edges of said side and bottom sections, said girder portions being normal to the shell.

58. A ship having a hull converging at its stem and stern and provided with decks, said hull and deck comprising sections of uniform type, each section including plating and frame girders united together at their edges into continuous plating and girder members, said girder portions being normal to the shell.

59. A ship having a hull converging at its stem and stern and provided with a tank top, said hull and tank top comprising sections of uniform type, each section including plating and frame girders united together at their edges into continuous plating and girder members, said girder portions being normal to the shell.

60. A ship having a hull converging at its stem and stern and provided with a bottom and tank top, said hull, bottom and tank top comprising sections of uniform type, each section including portions of plating and longitudinal girders, united together into continuous plating and girder members, said bottom and tank top girder members being united together into side girders, normal to the shell.

61. A ship having a hull converging at its stem and stern and provided with bulkheads, said hull and bulkheads comprising sections of uniform type, each section including plating and frame girders united together at their edges into continuous plating and girder members, said girder members being normal to the shell.

62. A ship's hull formed of cast sections, joined together, each section including longitudinal frame members with free ends welded at right angles to transverse frame members of the next section.

63. The combination claimed in claim 62 having the longitudinal members of one section cast integral with a transverse member at one end thereof and welded at right angles to a transverse member of the adjoining section.

64. A ship's hull consisting of a plurality of castings, each casting having an edge portion provided with a pocket and an edge portion provided with a stud to register with a pocket of an adjoining section.

65. A fabricated ship having curved sides converging at its stem and stern, built of sections, each including a plating member and a transverse member at an angle with the said plating member, the angles between the transverse and plating members of the different sections on a given side of a converging curved end portion of the ship being substantially the same.

66. The combination claimed in claim 65, with longitudinal girders joined to said transverse portions at uniform angles thereto.

67. The combination claimed in claim 66, the transverse girders including transverse frame members of the "longitudinal" type of ship.

68. The combination claimed in claim 67, the longitudinal girders including longitudinal frame members.

69. The combination claimed in claim 68 having a bilge, including sections joined in alinement with the said longitudinal girders to approximate the true water level curves of the ship.

70. The combination claimed in claim 65 having the said girders normal to the shell of the ship.

71. The combination claimed in claim 66, having the said longitudinal girders normal to the shell of the ship.

72. The combination claimed in claim 67 having the girders normal to the shell of the ship.

73. The combination claimed in claim 68 having the girders normal to the shell of the ship.

74. The combination claimed in claim 65 having deck sections with deck beams substantially registering with the transverse frames at the region of union.

75. A fabricated ship having a plurality of sections, each including a plating member and a transverse member joined therewith, said ship having flat side and bottom sections, and having decks composed of deck sections and rising at the ends for the purpose of sheer.

76. A ship having a keel composed of sections, each section comprising a bottom plating member and a girder member integral with the plating member, said sections joined longitudinally one to another and with the flooring on opposite sides of the keel.

77. In a ship, a backbone composed of cast metal sections, each having a center girder member of one section fitted between the keel plate and tank top portions of the backbone of the next section and secured thereto and to the next portion of the center girder and having the tank top and keel plate edge portions of the backbone of one section secured to the corresponding members of the next section.

78. The combination claimed in claim 77 having a cast stern post fitted into and secured to the said backbone.

79. The combination claimed in claim 77 having members of the said backbone welded to each other to form an integral metal connection.

80. In a ship, a backbone composed of cast metal sections, each having a girder member enlarged at one edge, and a plate member at the other edge, the girder member of one section extending beyond its plate member and registering with the girder member of a joining section, the plate member of said joining section extending beyond its girder member to register with the plate member of the first section.

81. The combination claimed in claim 77 having said sections welded end to end longitudinally.

82. The combination claimed in claim 80 having said sections welded end to end longitudinally.

83. A fabricated metal ship including sections having shell and transverse frame portions on the same side of a curved end portion of the hull at substantially the same angle, and deck beams for said ship registering with said transverse frame portions at their points of junction.

84. A ship's hull comprising two parts substantially parallel to each other at the mid-ship portion of the hull and converging thence until they meet at the stem and stern, said parts including cast steel sections provided with longitudinal girders, the corresponding girders of said parts being welded together at the converging parts of the hull.

85. A ship converging fore and aft and having decks including cast steel sections provided with transverse frames, said frames welded end edge to end edge into a continuous girder including the transverse frames, flooring and deck girders.

86. A metal ship including plating portions for a converging curved side of an end of a hull having transverse frame members canted with relation to the keel, said ship having also deck beams for said ship and mechanical joints between said transverse members and said deck beams to effectively join them.

In testimony whereof, I have affixed my signature to this specification.

MYRON F. HILL.